United States Patent
Kaneko et al.

(10) Patent No.: US 9,219,565 B2
(45) Date of Patent: Dec. 22, 2015

(54) OPTICAL TRANSMISSION APPARATUS AND DUMMY LIGHT INSERTING METHOD

(71) Applicant: FUJITSU LIMITED, Kawasaki-shi, Kanagawa (JP)

(72) Inventors: Shinichi Kaneko, Inagi (JP); Jyunji Tanaka, Chiba (JP); Haruki Watanabe, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 14/156,523

(22) Filed: Jan. 16, 2014

(65) Prior Publication Data

US 2014/0286635 A1    Sep. 25, 2014

(30) Foreign Application Priority Data

Mar. 25, 2013 (JP) ................................. 2013-063086

(51) Int. Cl.
*H04J 14/02* (2006.01)
*H04B 10/50* (2013.01)
*H04B 10/564* (2013.01)

(52) U.S. Cl.
CPC .......... *H04J 14/0221* (2013.01); *H04B 10/506* (2013.01); *H04B 10/564* (2013.01)

(58) Field of Classification Search
None
See application file for complete search history.

(56) References Cited

U.S. PATENT DOCUMENTS

| 2005/0024715 A1 | 2/2005 | Inoue et al. |
| 2006/0051093 A1 | 3/2006 | Manna |

FOREIGN PATENT DOCUMENTS

| EP | 1213865 | 6/2002 |
| JP | 2005-051598 | 2/2005 |
| JP | 2008-510388 | 4/2008 |
| WO | 2002-011338 | 2/2002 |
| WO | 2006-031340 | 3/2006 |

*Primary Examiner* — Darren E Wolf
(74) *Attorney, Agent, or Firm* — Fujitsu Patent Center

(57) ABSTRACT

An optical transmission apparatus includes a wavelength multiplexing unit that performs wavelength multiplexing with respect to dummy light for each channel of WDM and dummy light for each sub-band including the channels in plural; and a selecting unit that measures for each sub-band and corresponding to intensity of the channel-specific dummy light, transmission characteristics at a reception end, and according to measurement results, selects for each of the sub-bands, any one among the channel-specific dummy light and the sub-band-specific dummy light. The wavelength multiplexing unit wavelength multiplexes any of the channel-specific dummy light selected for each of the sub-bands by the selecting unit.

8 Claims, 23 Drawing Sheets

FIG.9

| SUB-BAND NUMBER | TRANS-MISSION LEVEL (dBm) | CHANNEL NUMBER | OSNR MEASURE-MENT (dB) | AVERAGE OSNR (dB) | STATE | SELECT-ED DUMMY LIGHT |
|---|---|---|---|---|---|---|
| 1 | 15.5 | λ1 | 18.50 | 18.47 | A (LINEAR) | SUB-BAND DUMMY |
| | | λ2 | 18.75 | | | |
| | | λ3 | 18.23 | | | |
| | | λ4 | 18.80 | | | |
| | | λ5 | 18.00 | | | |
| | 15.0 | λ1 | 18.20 | 17.87 | | |
| | | λ2 | 18.45 | | | |
| | | λ3 | 17.69 | | | |
| | | λ4 | 17.33 | | | |
| | | λ5 | 17.57 | | | |
| | : | : | : | : | | |
| | 7.0 | λ1 | 10.51 | 10.42 | | |
| | | λ2 | 10.77 | | | |
| | | λ3 | 10.32 | | | |
| | | λ4 | 10.46 | | | |
| | | λ5 | 10.00 | | | |
| : | : | : | : | : | : | : |
| 15 | 15.5 | λ76 | 14.03 | 14.15 | B (NON-LINEAR) | CHAN-NEL DUMMY |
| | | λ77 | 13.90 | | | |
| | | λ78 | 13.86 | | | |
| | | λ79 | 14.30 | | | |
| | | λ80 | 14.60 | | | |
| | 15.0 | λ76 | 14.10 | 14.28 | | |
| | | λ77 | 14.02 | | | |
| | | λ78 | 14.23 | | | |
| | | λ79 | 14.40 | | | |
| | | λ80 | 14.60 | | | |
| | : | : | : | : | | |
| | 7.0 | λ76 | 10.51 | 10.42 | | |
| | | λ77 | 10.77 | | | |
| | | λ78 | 10.32 | | | |
| | | λ79 | 10.46 | | | |
| | | λ80 | 10.00 | | | |

57

| SUB-BAND NUMBER | CHANNEL NUMBER | OSNR VALUE (dB) |
|---|---|---|
| 1 | λ1 | 18.50 |
| | λ2 | 18.75 |
| | λ3 | 18.23 |
| | λ4 | 18.80 |
| | λ5 | 18.00 |
| 2 | λ6 | 18.24 |
| ⋮ | ⋮ | ⋮ |
| 15 | λ80 | 10.00 |

FIG.20

| SUB-BAND NUMBER | TRANS-MISSION LEVEL (dBm) | CHANNEL NUMBER | OSNR MEASURE-MENT (dB) | AVERAGE OSNR (dB) | STATE | SELECT-ED DUMMY LIGHT |
|---|---|---|---|---|---|---|
| 1 | 15.5 | λ1 | 18.50 | 18.47 | A (LINEAR) | SUB-BAND DUMMY |
| | | λ2 | 18.75 | | | |
| | | λ3 | 18.23 | | | |
| | | λ4 | 18.80 | | | |
| | | λ5 | 18.00 | | | |
| | ⋮ | ⋮ | ⋮ | ⋮ | | |
| | 11.5 | λ1 | 14.80 | 14.39 | | |
| | | λ2 | 14.85 | | | |
| | | λ3 | 14.00 | | | |
| | | λ4 | 14.10 | | | |
| | | λ5 | 14.14 | | | |
| | 11.0 (REFER-ENCE VALUE) | λ1 | 14.00 | 13.38 | | |
| | | λ2 | 14.22 | | | |
| | | λ3 | 13.35 | | | |
| | | λ4 | 13.67 | | | |
| | | λ5 | 13.88 | | | |
| | 10.5 | λ1 | 13.95 | 13.45 | | |
| | | λ2 | 13.66 | | | |
| | | λ3 | 13.00 | | | |
| | | λ4 | 13.21 | | | |
| | | λ5 | 13.38 | | | |
| | ⋮ | ⋮ | ⋮ | ⋮ | | |
| | 7.0 | λ1 | 9.81 | 9.79 | | |
| | | λ2 | 9.88 | | | |
| | | λ3 | 9.65 | | | |
| | | λ4 | 9.74 | | | |
| | | λ5 | 9.89 | | | |

FIG.22

| SUB-BAND NUMBER | TRANS-MISSION LEVEL (dBm) | CHANNEL NUMBER | OSNR MEASURE-MENT (dB) | AVERAGE OSNR (dB) | STATE | SELECT-ED DUMMY LIGHT |
|---|---|---|---|---|---|---|
| 6 | 15.5 | λ26 | 8.10 | 8.27 | B (NON-LINEAR) | CHAN-NEL DUMMY |
| | | λ27 | 8.21 | | | |
| | | λ28 | 8.31 | | | |
| | | λ29 | 8.60 | | | |
| | | λ30 | 8.10 | | | |
| | ⋮ | ⋮ | ⋮ | ⋮ | | |
| | 11.5 | λ26 | 13.40 | 13.29 | | |
| | | λ27 | 13.30 | | | |
| | | λ28 | 13.20 | | | |
| | | λ29 | 13.29 | | | |
| | | λ30 | 13.28 | | | |
| | 11.0 (REFER-ENCE VALUE) | λ26 | 13.88 | 13.46 | | |
| | | λ27 | 13.60 | | | |
| | | λ28 | 13.20 | | | |
| | | λ29 | 13.29 | | | |
| | | λ30 | 13.28 | | | |
| | 10.5 | λ26 | 13.88 | 13.49 | | |
| | | λ27 | 13.66 | | | |
| | | λ28 | 13.21 | | | |
| | | λ29 | 13.33 | | | |
| | | λ30 | 13.32 | | | |
| | ⋮ | ⋮ | ⋮ | ⋮ | | |
| | 7.0 | λ26 | 9.75 | 9.72 | | |
| | | λ27 | 9.70 | | | |
| | | λ28 | 9.65 | | | |
| | | λ29 | 9.66 | | | |
| | | λ30 | 9.82 | | | |

FIG.25

| SUB-BAND NUMBER | TRANS-MISSION LEVEL (dBm) | CHANNEL NUMBER | OSNR MEASURE-MENT (dB) | AVERAGE OSNR (dB) | STATE | SELECTED DUMMY LIGHT |
|---|---|---|---|---|---|---|
| 3 | 15.5 | λ11 | 15.50 | 15.47 | C (NON-PROPOR-TIONAL) | CHAN-NEL DUMMY |
| | | λ12 | 15.75 | | | |
| | | λ13 | 15.23 | | | |
| | | λ14 | 15.80 | | | |
| | | λ15 | 15.00 | | | |
| | : | : | : | : | | |
| | 11.5 | λ11 | 13.80 | 13.39 | | |
| | | λ12 | 13.85 | | | |
| | | λ13 | 13.00 | | | |
| | | λ14 | 13.10 | | | |
| | | λ15 | 13.14 | | | |
| | 11.0 (REFER-ENCE VALUE) | λ11 | 13.90 | 13.48 | | |
| | | λ12 | 13.22 | | | |
| | | λ13 | 13.00 | | | |
| | | λ14 | 13.33 | | | |
| | | λ15 | 13.88 | | | |
| | 10.5 | λ11 | 13.94 | 13.45 | | |
| | | λ12 | 13.66 | | | |
| | | λ13 | 13.00 | | | |
| | | λ14 | 13.21 | | | |
| | | λ15 | 13.38 | | | |
| | : | : | : | : | | |
| | 7.0 | λ11 | 9.81 | 9.79 | | |
| | | λ12 | 9.88 | | | |
| | | λ13 | 9.65 | | | |
| | | λ14 | 9.74 | | | |
| | | λ15 | 9.89 | | | |

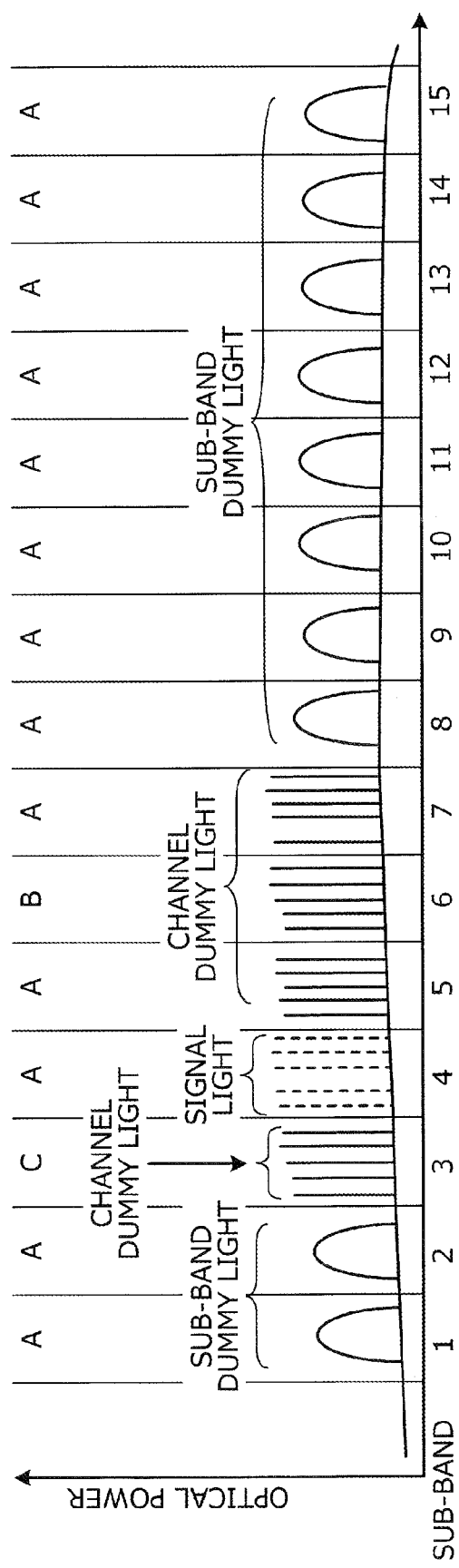

OPTICAL TRANSMISSION APPARATUS AND DUMMY LIGHT INSERTING METHOD

CROSS REFERENCE TO RELATED APPLICATIONS

This application is based upon and claims the benefit of priority of the prior Japanese Patent Application No. 2013-063086, filed on Mar. 25, 2013, the entire contents of which are incorporated herein by reference.

FIELD

The embodiments discussed herein are related to an optical transmission apparatus and a dummy light inserting method.

BACKGROUND

A conventional system is present that inserts dummy light formed of spontaneous emission light into an unused channel of a wavelength division multiplexing (WDM) system. In this system, the wavelength of the dummy light is selected based on distortion of a gain spectrum of the WDM system (Published Japanese-Translation of PCT Application, Publication No. 2008-510388).

Conventionally, all the wavelengths used in a system may be divided by a constant wavelength band into multiple sections called sub-bands and for each sub-band, dummy light of the same wavelength band as the sub-band wavelength band is inserted. In the following description, the dummy light of the same wavelength band as a sub-band wavelength band will sometimes be referred to as sub-band dummy light.

A sub-band includes multiple channels, i.e., wavelengths, and the transmission power of the sub-band dummy light is greater than the transmission power of the signal light of one channel. Therefore, the width of a sub-band is determined such that the transmission power of the sub-band dummy light becomes equivalent to the total transmission power of the signal light of all the channels included in the sub-band.

Therefore, if signal light is newly added to some channels of a sub-band from which sub-band dummy light is removed, the transmission power lost by removal of the sub-band dummy light cannot be compensated by the transmission power of the added signal light alone. In this case, to compensate for the shortage of the transmission power, the transmission level of sub-band dummy light of another sub-band is adjusted in some cases. However, the sub-band dummy light has a wavelength band that is wider than the signal light and therefore, causes a problem in that the transmission level of the sub-band dummy light cannot be finely adjusted.

If sub-band dummy light is inserted into a sub-band from which signal light has been removed or if an optical cable is additionally connected for restoration of a transmission path where a failure occurs, the transmission level of sub-band dummy light of another sub-band may be adjusted. Therefore, the same problem occurs in these cases.

Particularly, in a sub-band in a nonlinear state in which a nonlinear effect occurs, signal light characteristics at an opposing station deteriorate even when the transmission level at the transmission end is increased. Further, signal characteristics become unstable and a slight variation in the transmission level may cause abrupt fluctuations or deterioration of the signal characteristics. Therefore, although it is desirable for a sub-band in the nonlinear state not to change the transmission level of the sub-band dummy light, the transmission level is changed for improvement in the characteristics in some cases.

If interference occurs between signal light and dummy light due to a phenomenon called optical four-wave mixing, which is a main cause of the nonlinear effect, a variation in transmission level of the dummy light affects the signal light. If the wavelength band of the dummy light is the same as the wavelength band of the sub-band, the power ratio of the dummy light to the signal light becomes large and therefore, if the transmission level of the sub-band dummy light cannot be finely adjusted, the signal light is significantly affected.

Instead of inserting the sub-band dummy light, dummy light having the same wavelength as signal light can be inserted for each channel. In the following description, dummy light having the same wavelength as signal light will sometimes be referred to as channel dummy light. If a distinction between the sub-band dummy light and the channel dummy light is not necessary, the light will sometimes be referred to as simply dummy light.

However, if the channel dummy light is inserted, since the number of channels into which the dummy light is the product of the number of sub-bands multiplied by the number of channels per sub-band, the number of channels into which the dummy light is inserted becomes larger than in a case of inserting the sub-band dummy light. Therefore, at the time of initial introduction of an optical transmission apparatus or at the time of addition or removal of signal light, when the transmission levels of the signal light and the dummy light are adjusted in the transmission-side optical transmission apparatus so as to optimize the reception-side signal light characteristics of the opposing station, time and effort are problematically required.

SUMMARY

According to an aspect of an embodiment, an optical transmission apparatus includes a wavelength multiplexing unit that performs wavelength multiplexing with respect to dummy light for each channel of WDM and dummy light for each sub-band including the channels in plural; and a selecting unit that measures for each sub-band and corresponding to intensity of the channel-specific dummy light, transmission characteristics at a reception end, and according to measurement results, selects for each of the sub-bands, any one among the channel-specific dummy light and the sub-band-specific dummy light. The wavelength multiplexing unit wavelength multiplexes any of the channel-specific dummy light selected for each of the sub-bands by the selecting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram of an example of a sub-band state management table;

FIG. 20 is a diagram of an example of a record for sub-band number 1 in the sub-band state management table;

FIG. 22 is a diagram of an example of a record for sub-band number 6 in the sub-band state management table;

FIG. 25 is a diagram of an example of a record for sub-band number 3 in the sub-band state management table;

FIG. 27 is a diagram of an example of an emission spectrum reflecting the record contents depicted in FIGS. 20, 22, and 25.

DESCRIPTION OF EMBODIMENTS

Figure 1:
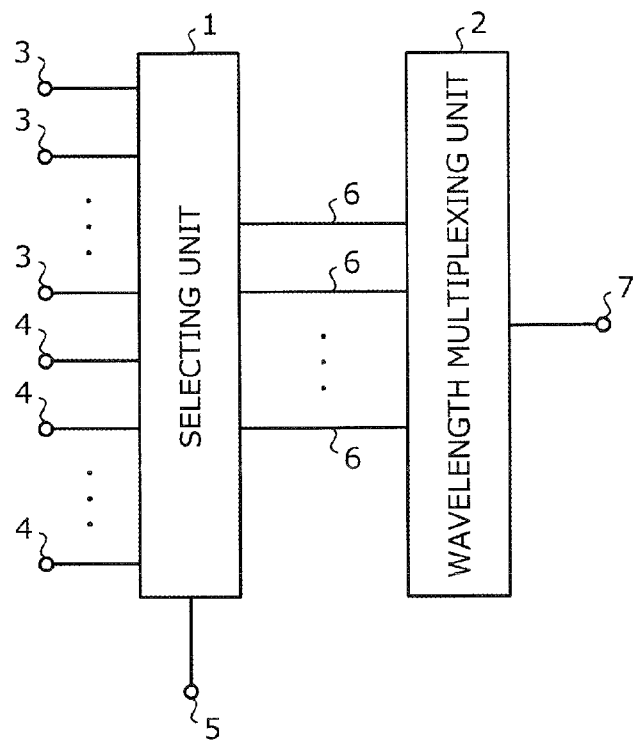
FIG. 1 is a diagram of a first example of an optical transmission apparatus according to an embodiment.

Embodiments of an optical transmission apparatus and a dummy light inserting method will be described in detail with reference to the accompanying drawings. In the description of the each of the embodiments below, identical components are given the same reference numerals and redundant description is omitted.

Figure 2:
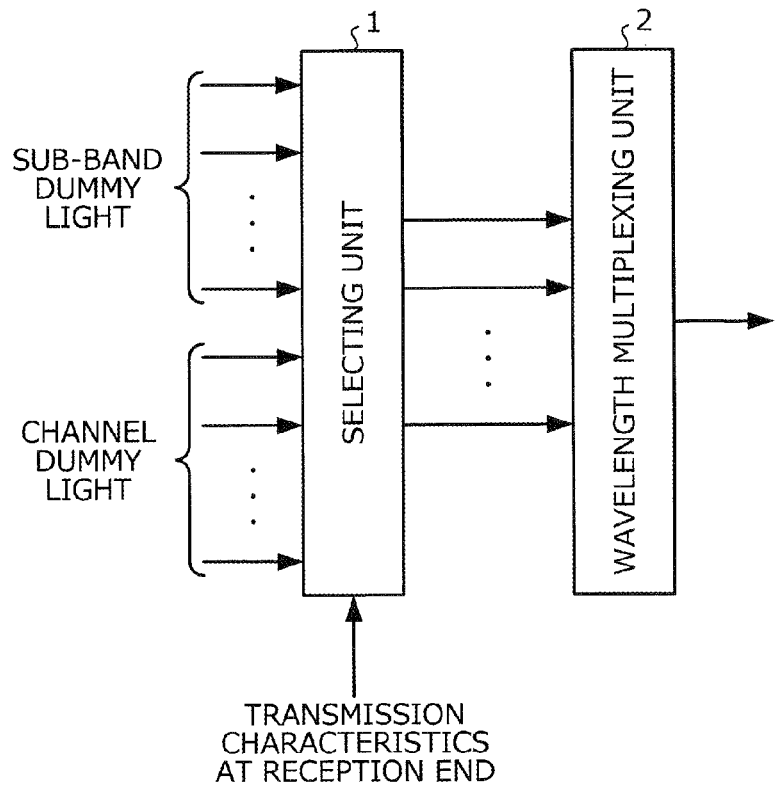
FIG. 2 is a diagram of optical signal flow in the optical transmission apparatus depicted in FIG. 1.

FIG. 1 is a diagram of a first example of an optical transmission apparatus according to an embodiment. FIG. 2 is a diagram of optical signal flow in the optical transmission apparatus depicted in FIG. 1. As depicted in FIGS. 1 and 2, the optical transmission apparatus is an apparatus used in a WDM system and has a selecting unit 1 and a wavelength multiplexing unit 2.

The selecting unit 1 is connected to multiple sub-band dummy light input ports 3, multiple channel dummy light input ports 4, and a transmission characteristic input terminal 5. Into each of the sub-band dummy light input ports 3, sub-band dummy light of the sub-band is input. Into each of the channel dummy light input ports 4, channel dummy light of the channel is input.

The transmission characteristic input terminal 5 receives input of transmission characteristics at a reception end (not depicted) that receives an optical signal output from the optical transmission apparatus depicted in FIG. 1. Based on the transmission characteristics at the reception end, the selecting unit 1 measures the transmission characteristics at the reception end with respect to the intensity of the channel dummy light for each sub-band. The selecting unit 1 selects any one among the channel dummy light and the sub-band dummy light, for each sub-band according to the measurement results of the transmission characteristics at the reception end.

The wavelength multiplexing unit 2 is connected to the selecting unit 1 via multiple optical transmission paths 6. An optical output port 7 is connected to the wavelength multiplexing unit 2. The wavelength multiplexing unit 2 wavelength multiplexes the sub-band dummy light or the channel dummy light as selected by the selecting unit 1 for each sub-band and outputs the light from the optical output port 7.

Figure 3:
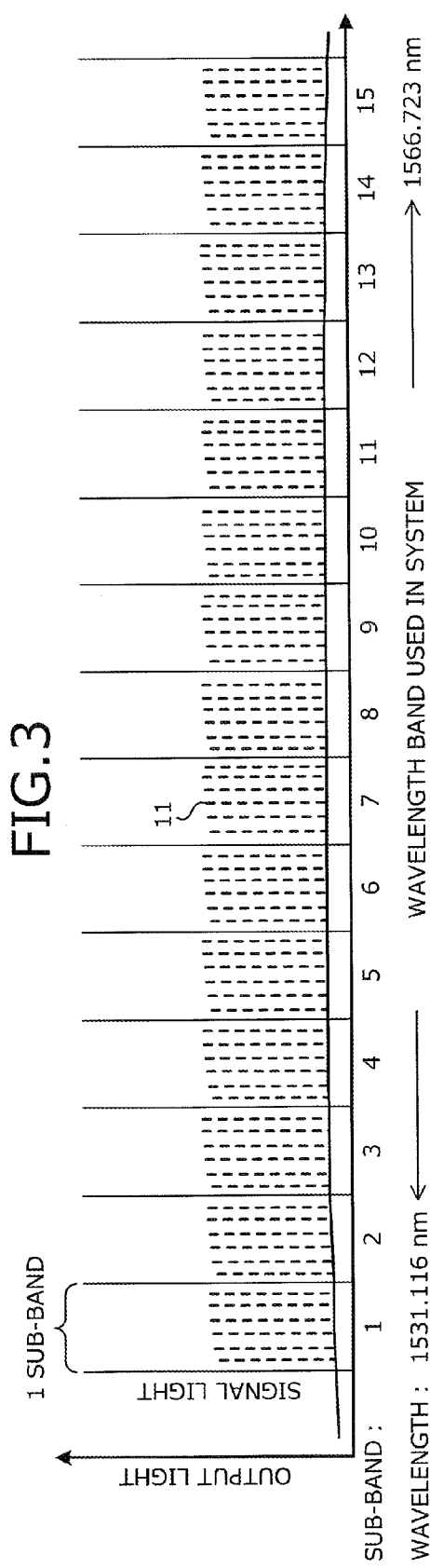
FIG. 3 is a diagram of an example of sub-bands.

FIG. 3 is a diagram of an example of sub-bands. In the example depicted in FIG. 3, a WDM system uses a wavelength band from 1531.116 nm to 1566.723 nm. The channel wavelength interval is 0.4 nm, for example, and therefore, the frequency interval is 25 GHz, for example. The sub-band width is 150 GHz, for example.

Therefore, the number of signals that can be accommodated per sub-band is six channels and the total number of sub-bands is 15. In FIG. 3, a dashed line in each sub-band represents optical output of signal light 11. Various modifications can be made to the wavelength band used in the WDM system, the channel wavelength interval, the sub-band width, and the number of signals that can be accommodated per sub-band or the number of sub-bands.

Figure 4:
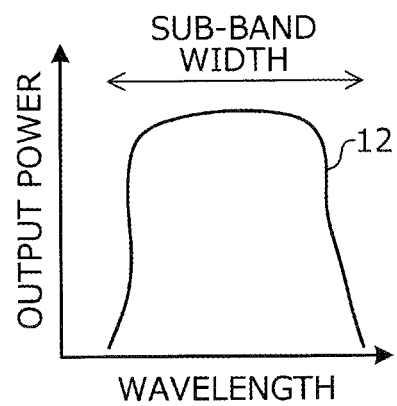
FIG. 4 is a diagram of sub-band dummy light.

FIG. 4 is a diagram of the sub-band dummy light. As depicted in FIG. 4, sub-band dummy light 12 is characterized by a large spectrum area, i.e., high output power, and a high sub-band dummy light output power ratio relative to the signal light overall. Even a slight change in transmission level of the sub-band dummy light 12 varies the transmission level of a sub-band.

If the transmission level of the sub-band dummy light of a given sub-band decreases, the transmission level of an adjacent sub-band relatively increases by the amount of the decrease. Since one sub-band dummy light is inserted into a sub-band, time and effort of adjusting the transmission level of the sub-band can be reduced.

Figure 5:
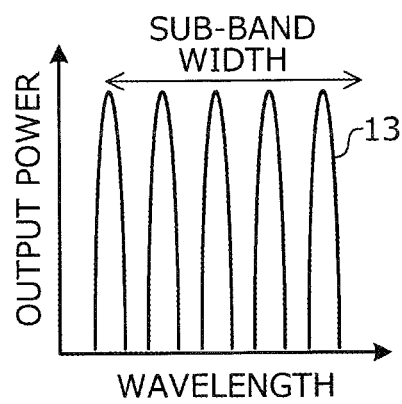
FIG. 5 is a diagram of channel dummy light.

FIG. 5 is a diagram of the channel dummy light. As depicted in FIG. 5, channel dummy light 13 is characterized by a small spectrum area and a low channel-dummy-light output power ratio relative to the entire signal light. Since the transmission level of the channel dummy light can be changed for each channel, variations in the transmission level of an entire sub-band can be suppressed to be small. For example, FIG. 5 depicts a case when the number of signals that can be accommodated per sub-band is five channels.

Although a decrease in the transmission level of given channel dummy light results in a relative increase in the transmission level of an adjacent channel, the variation is local and minute. Since channel dummy lights are inserted into a sub-band up to the number of the channels making up the sub-band and the transmission level of each of the channel dummy lights can be adjusted, the transmission level of the sub-band can finely be adjusted.

Therefore, from the measurement result of transmission characteristics at the reception end, if it is determined that the transmission level does not have to be finely adjustable in a sub-band, the sub-band dummy light may be inserted. As a result, the time and effort for adjusting the transmission level of the sub-band can be saved. For example, if it is determined that the transmission level does not have to be finely adjustable in a sub-band, the sub-band may be in a linear state. In the linear state, an increase in the transmission level at the transmission end improves the signal light characteristics at the opposing station.

On the other hand, from the measurement result of transmission characteristics at the reception end, if it is determined that fine adjustment of the transmission level is desirable in a sub-band, the channel dummy light is preferably inserted. For example, if it is determined that fine adjustment of the transmission level is desirable in a sub-band, the sub-band may be in a nonlinear state. If a sub-band is in neither the linear state nor the nonlinear state, the channel dummy light may be inserted.

According to the optical transmission apparatus depicted in FIG. 1, the sub-band dummy light or the channel dummy light is inserted for each sub-band and based on the measurement result of the transmission characteristics at the reception end. As a result, since the channel dummy light is inserted into a sub-band when fine adjustment of the transmission level is desirable, the transmission level of the dummy light can be finely adjusted. Therefore, if the wavelengths of the signal light are increased or decreased after the start of operation of the optical transmission apparatus, the transmission level of the dummy light can be finely adjusted to suppress the effect on the existing signal lights. Since the sub-band dummy light is inserted into a sub-band when the transmission level does not have to be finely adjustable, the transmission level of the dummy light can be quickly adjusted as compared to a case of inserting the channel dummy lights into all the channels, for example, at the time of initial introduction of the optical transmission apparatus.

Figure 6:
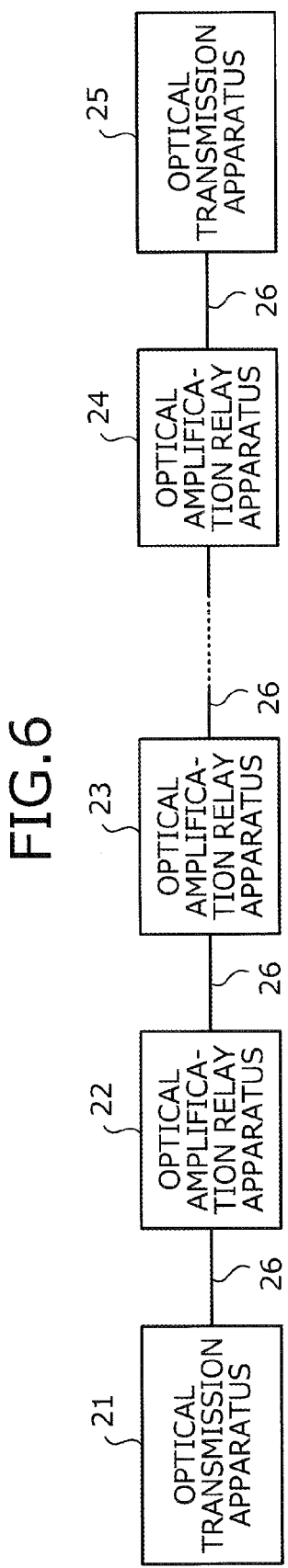
FIG. 6 is a diagram of an example of an optical transmission system.

FIG. 6 is a diagram of an example of an optical transmission system. As depicted in FIG. 6, the optical transmission system has an optical transmission apparatus 21 acting as the transmission end and an optical transmission apparatus 25 acting as the reception end, for example. The optical transmission apparatus 21 acting as the transmission end transmits an optical signal. The optical transmission apparatus 25 acting as the reception end receives the optical signal.

One or more optical amplification relay apparatuses 22, 23, and 24 may be disposed in a transmission path 26 between the optical transmission apparatus 21 acting as the transmission end and the optical transmission apparatus 25 acting as the reception end. The optical amplification relay apparatuses 22, 23, and 24 amplify optical signals transmitted from the optical transmission apparatus 21 or the optical amplification relay apparatuses 22, 23 upstream and transmit the optical signals to the optical amplification relay apparatuses 23, 24, or the optical transmission apparatus 25 downstream. Each of the apparatuses 21 to 25 is connected through the transmission path 26. For example, an optical fiber is an example of the transmission path 26.

The optical amplification relay apparatuses 22, 23, and 24 are generally designed with consideration of the maximum number of wavelengths that may be used in the optical transmission system. In this regard, at the time of initial introduction of the optical transmission system, the number of wavelengths of signal light may be smaller. In this case, the dummy light is inserted into sub-bands without inserting signal lights to ensure sufficient power for the optical amplification relay apparatuses 22, 23, and 24, thereby prevent deterioration of the reception characteristics of the signal lights. After the start of operation of the optical transmission system, the dummy light is removed as the signal light wavelengths increase and is completely eliminated when wavelengths of the signal light reach the maximum number of wavelengths.

Figure 7:
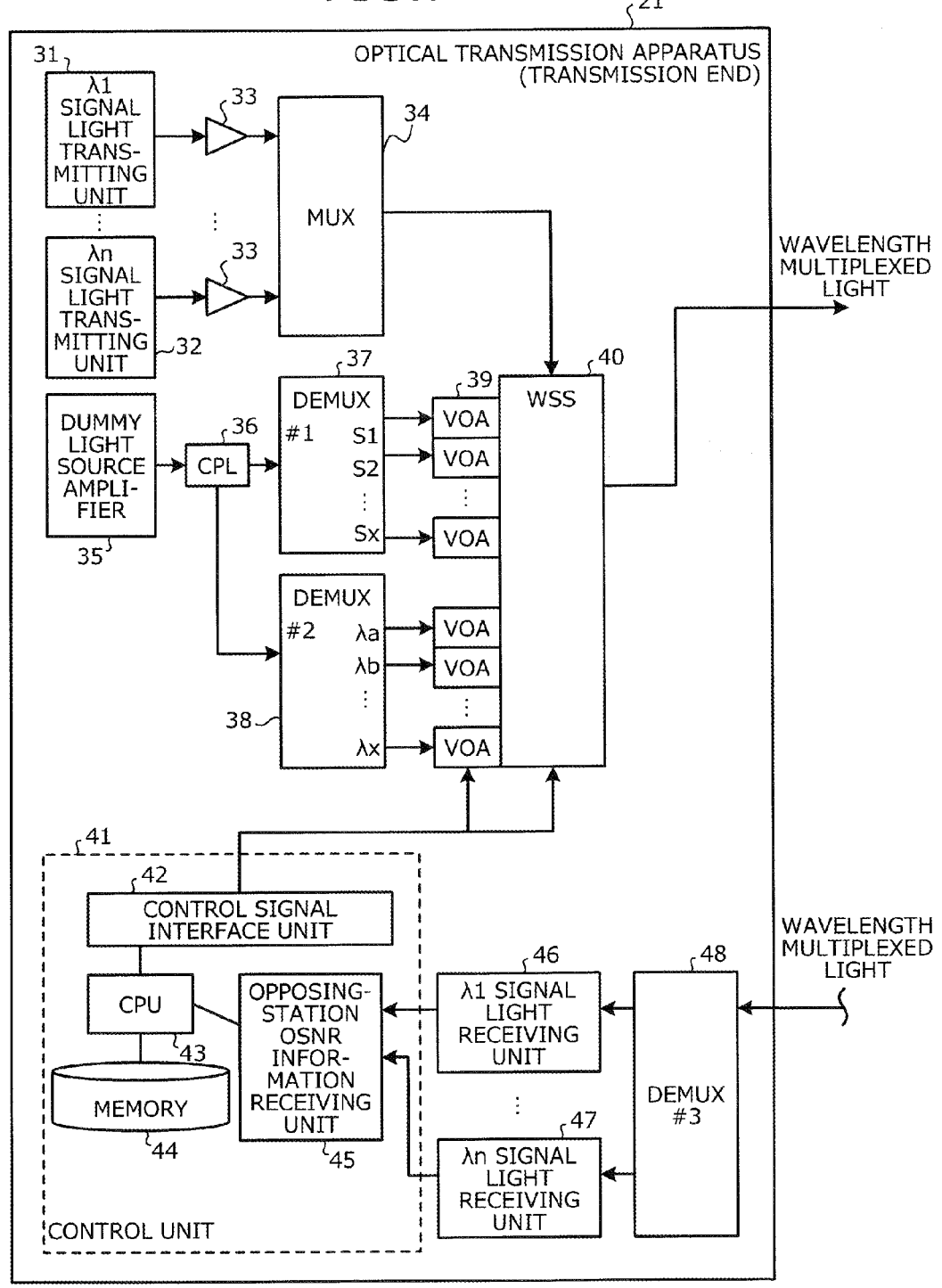
FIG. 7 is a diagram of a hardware configuration of a second example of the optical transmission apparatus according to the embodiment.

FIG. 7 is a diagram of a hardware configuration of a second example of the optical transmission apparatus according to the embodiment. As depicted in FIG. 7, the optical transmission apparatus 21 acting as the transmission end has a dummy light source amplifier 35, an optical coupler (CPL) 36, a first wavelength demultiplexing device (DEMUX#1) 37, a second wavelength demultiplexing device (DEMUX#2) 38, multiple variable optical attenuators (VOA) 39, and wavelength selection switch (WSS) 40.

The dummy light source amplifier 35 outputs spontaneous emission light (amplified spontaneous emission (ASE)) without polarization dependency, for example. A spare dummy light source amplifier may be prepared so that a redundant configuration is ensured to improve reliability.

The optical coupler 36 is connected to the dummy light source amplifier 35. The optical coupler 36 divides the light output from the dummy light source amplifier 35 into two branches, for example.

The first wavelength demultiplexing device 37 is connected to the optical coupler 36. The first wavelength demultiplexing device 37 has a grid of sub-bands. The first wavelength demultiplexing device 37 demultiplexes the light output from the optical coupler 36 into sub-band dummy lights corresponding to wavelength bands S1 to Sx of the sub-bands and outputs the sub-band dummy lights from respective corresponding output ports. The number of the output ports of the first wavelength demultiplexing device 37 is greater than or equal to the maximum number of sub-bands used in the WDM system. An arrayed-waveguide grating (AWG) device is an example of the first wavelength demultiplexing device 37.

The second wavelength demultiplexing device 38 is coupled to the optical coupler 36. The second wavelength demultiplexing device 38 has the same grid as the signal lights. The second wavelength demultiplexing device 38 demultiplexes the light output from the optical coupler 36 into channel dummy lights corresponding to wavelengths $\lambda a$ to $\lambda x$ of the signal lights and outputs the channel dummy lights from respective corresponding output ports. The number of the output ports of the second wavelength demultiplexing device 38 is greater than or equal to the maximum number of the channels used in the WDM system. An AWG device is an example of the second wavelength demultiplexing device 38.

The variable optical attenuators 39 are respectively connected one by one to the output ports of the first wavelength demultiplexing device 37 and the output ports of the second wavelength demultiplexing device 38. The variable optical attenuators 39 are connected to a control signal interface unit 42 of a control unit 41 described later. Based on a level adjustment signal output from the control signal interface unit 42, the variable optical attenuators 39 respectively adjust the transmission levels of the sub-band dummy lights output from the first wavelength demultiplexing device 37 and the transmission levels of the channel dummy lights output from the second wavelength demultiplexing device 38.

The input ports of the wavelength selection switch 40 are respectively connected to the variable optical attenuators 39. The wavelength selection switch 40 is connected to the control signal interface unit 42 of the control unit 41 described later. The wavelength selection switch 40 selects and takes out the light of the desired input port based on a dummy light selection signal output from the control signal interface unit 42. Therefore, the wavelength selection switch 40 selects a dummy light inserted into a sub-band, among the sub-band dummy lights output from the first wavelength demultiplexing device 37 and the channel dummy lights output from the second wavelength demultiplexing device 38.

The wavelength selection switch 40 is connected to a wavelength multiplexing device (MUX) 34 described later and an output port (not depicted) of the apparatus 21. The wavelength selection switch 40 wavelength multiplexes the signal light output from the wavelength multiplexing device 34 and the dummy light inserted into a sub-band and outputs the light to a transmission path connected to the output port of the apparatus 21.

The optical transmission apparatus 21 acting as the transmission end has the control unit 41, n signal light receiving units 46, 47 corresponding to the wavelengths of λ1 to λn, and a third wavelength demultiplexing device (DEMUX#3) 48. An integer denoted by n is the number of the channels used in the WDM system. The optical transmission apparatus 21 acting as the transmission end receives wavelength multiplexed light from the opposing station, i.e., the optical transmission device acting as the reception end (not depicted) and receiving the wavelength multiplexed light output by the optical transmission apparatus 21.

The third wavelength demultiplexing device 48 is connected to an input port (not depicted) of the optical transmission apparatus 21. The third wavelength demultiplexing device 48 receives the wavelength multiplexed light from a transmission path connected to the input port of the optical transmission apparatus 21, divides the light into lights of the wavelengths λ1 to λn, and outputs the lights from respective corresponding output ports. An AWG device is an example of the third wavelength demultiplexing device 48.

The signal light receiving units 46, 47 are respectively connected to the output ports of the third wavelength demultiplexing device 48. The signal light receiving units 46, 47 receive the signal lights of the wavelengths λ1 to λn from the third wavelength demultiplexing device 48 and, extract from the signal lights and output to the control unit 41, OSNR information of the opposing station.

The control unit 41 determines the state of a sub-band based on the OSNR information of the opposing station and determines the type of the dummy light based on the determined state. The control unit 41 has the control signal interface unit 42, a central processing unit (CPU) 43, memory 44, and an opposing-station optical signal-to-noise ratio (OSNR) information receiving unit 45. The OSNR information is an example of transmission characteristics at the reception end and corresponding to the intensity of the channel dummy light.

The opposing-station OSNR information receiving unit 45 is connected to the signal light receiving units 46, 47. The opposing-station OSNR information receiving unit 45 receives and outputs the OSNR information of the opposing station, output from the respective signal light receiving units 46, 47 to the CPU 43. The opposing-station OSNR information receiving unit 45 may be implemented by a processor such as a field programmable gate array (FPGA), for example.

The CPU 43 is connected to the opposing-station OSNR information receiving unit 45. The CPU 43 uses the OSNR information of the opposing station and output from the opposing-station OSNR information receiving unit 45, to execute a program that implements a dummy light inserting method described later. By executing the program, the CPU 43 may store for each channel, a transmission level value and an OSNR value into the memory 44 and manage the values as a table, for example.

The CPU 43 obtains an average of the OSNR values for each sub-band and determines the state of the sub-band, for example, the linear state or the nonlinear state, from relationship between a transmission level value and the average of the OSNR values and thereby, determines the type of the dummy light, based on the determined state of the sub-band. A state of neither the linear state nor the nonlinear state may be provided as the state of a sub-band. In this case, the CPU 43 determines if the sub-band is in the linear state or the nonlinear state or in neither state.

The CPU 43 may store information on the average values of the OSNR values, the states of the sub-bands, and the types of the dummy lights into the memory 44 and manage the values and information as a table along with the transmission level values and the OSNR values. The CPU 43 outputs the level adjustment signal and the dummy light selection signal, based on the table stored in the memory 44.

The memory 44 is connected to the CPU 43. The memory 44 may include random access memory (RAM) and read only memory (ROM). The memory 44 may store a boot program, an operating system, and/or the program implementing the dummy light inserting method described later, executed by the CPU 43. The memory 44 may be used as a work area of the CPU 43. The memory 44 may store the table described above.

The control signal interface unit 42 outputs to the variable optical attenuators 39 and the wavelength selection switch 40, respectively, the level adjustment signal and the dummy light selection signal output from the CPU 43. As a result, the sub-band dummy light or the channel dummy light is selected for each sub-band and the transmission level of the dummy light is adjusted. The control signal interface unit 42 may be implemented by a processor such as an FPGA, for example.

The optical transmission apparatus 21 acting as the transmission end has n signal light transmitting units 31, 32 corresponding to the wavelengths of λ1 to λn, multiple optical amplifiers 33, and the wavelength multiplexing device 34. The signal light transmitting units 31, 32 output the respective signal lights of the wavelengths λ1 to λn.

The optical amplifiers 33 are respectively connected one by one to the signal light transmitting units 31, 32. Under the control of the control unit 41, the optical amplifiers 33 adjust the respective transmission levels of the signal lights output from the signal light transmitting units 31, 32, for example.

The wavelength multiplexing device 34 is connected to the optical amplifiers 33. The wavelength multiplexing device 34 wavelength multiplexes the signal lights output from the optical amplifiers 33 and outputs the light to the wavelength selection switch 40.

In the configuration depicted in FIG. 7, the wavelength selection switch 40 and the control unit 41 are an example of a selecting unit. The wavelength selection switch 40 is an example of a wavelength multiplexing unit. The dummy light source amplifier 35, the optical coupler 36, and the first wavelength demultiplexing device 37 are an example of a second optical output unit. The dummy light source amplifier 35, the optical coupler 36, and the second wavelength demultiplexing device 38 are an example of a first optical output unit.

Figure 8:
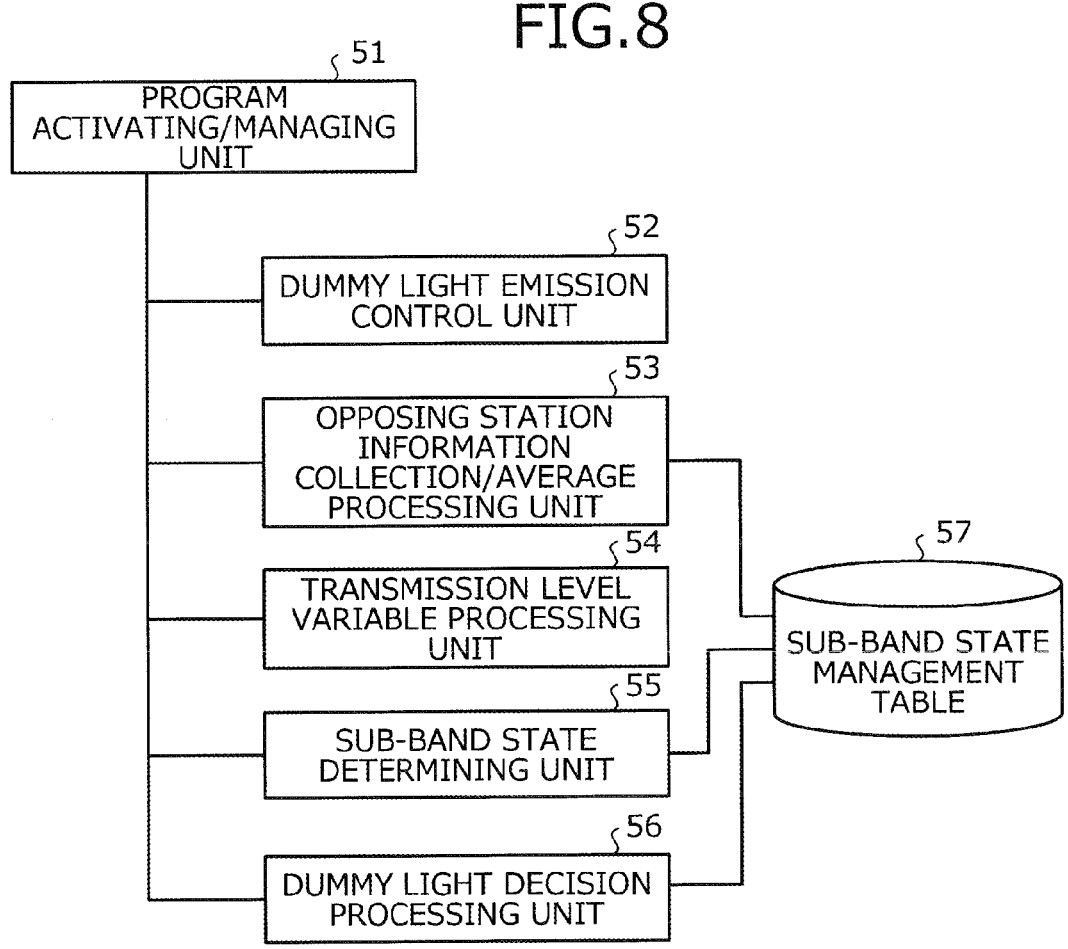
FIG. 8 is a diagram of an example of a functional configuration of a control unit in the optical transmission apparatus depicted in FIG. 7.

FIG. 8 is a diagram of an example of a functional configuration of a control unit in the optical transmission apparatus depicted in FIG. 7. As depicted in FIG. 8, the optical transmission apparatus 21 acting as the transmission end implements a program activating/managing unit 51, a dummy light emission control unit 52, an opposing station information collection/average processing unit 53, a transmission level variable processing unit 54, a sub-band state determining unit 55, and a dummy light decision processing unit 56.

A sub-band state management table 57 is implemented in the memory 44. These functional units 51 to 56 and the table 57 are implemented by executing the program implements the dummy light inserting method described later, on the CPU 43 of the control unit 41.

The program activating/managing unit 51 activates the program that implements the dummy light inserting method described later and calls the functional units 52 to 56 according to the execution of the program. The dummy light emission control unit 52 outputs the dummy light selection signal to the wavelength selection switch 40, thereby allowing the wavelength selection switch 40 to select the dummy light. In other words, the dummy light emission control unit 52 provides the emission control of the dummy light.

The opposing station information collection/average processing unit 53 collects, for example, the OSNR values of the opposing station, obtains the average value of the OSNR values for each sub-band, and stores the OSNR values and the average values into the sub-band state management table 57. The transmission level variable processing unit 54 outputs the level adjustment signal to the variable optical attenuators 39, thereby allowing the variable optical attenuators 39 to change the transmission level of the channel dummy light.

The sub-band state determining unit 55 refers to the sub-band state management table 57 to determine the state of a sub-band, from the relationship between the transmission level value of the channel dummy light and the average value of the OSNR values. The sub-band state determining unit 55 may store the state of the sub-band into the sub-band state management table 57. The dummy light decision processing unit 56 decides the type of the dummy light based on the state of the sub-band. The dummy light decision processing unit 56 may acquire the state of the sub-band from the sub-band state management table 57.

FIG. 9 is a diagram of an example of the sub-band state management table. As depicted in FIG. 9, the sub-band state management table 57 may have a record for each sub-band number. In each record, the OSNR measurement values of the channels in the opposing station and average values thereof may be stored for each transmission level value of the channel dummy light.

The sub-band state management table 57 may store the state of the sub-band and the type of dummy light for each sub-band number. Although numerical values are depicted in FIG. 9 as an example, the number of sub-bands, the number of channels per sub-band, and the transmission level value are not limited to the numerical values of the depicted example. The OSNR measurement values and the OSNR average values are an example.

Figure 10:
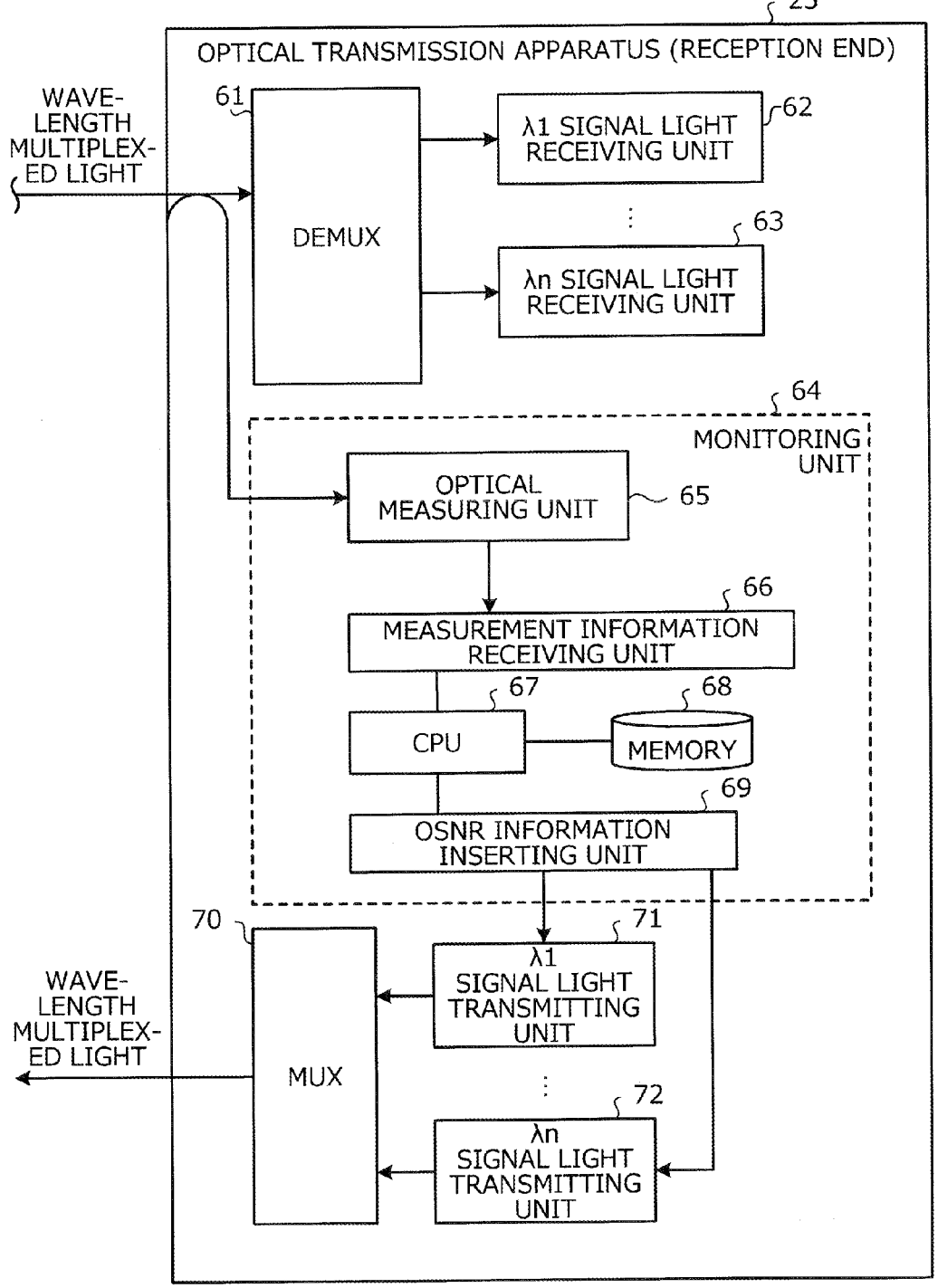
FIG. 10 is a diagram of an example of a hardware configuration of the optical transmission apparatus acting as a reception end.

FIG. 10 is a diagram of an example of a hardware configuration of the optical transmission apparatus acting as the reception end. As depicted in FIG. 10, the optical transmission apparatus 25 acting as the reception end has a monitoring unit 64, n signal light transmitting units 71, 72 corresponding to the wavelengths of $\lambda 1$ to $\lambda n$, and a wavelength multiplexing device (MUX) 70. The optical transmission apparatus 25 divides the wavelength multiplexed light input from the transmission path to the input port (not depicted) of the apparatus 25 into two branches, inputs one branch into the monitoring unit 64, and inputs the other branch into a wavelength demultiplexing device (DEMUX) 61 described later.

The monitoring unit 64 monitors characteristics of the input light and, measures and outputs the OSNR values of the respective channels to the signal light transmitting units 71, 72. The monitoring unit 64 has an optical measuring unit 65, a measurement information receiving unit 66, a CPU 67, memory 68, and an OSNR information inserting unit 69.

The optical measuring unit 65 measures the spectrum of the wavelength multiplexed light input to the monitoring unit 64 to measure and output to the measurement information receiving unit 66, an OSNR value for each channel. For example, a spectrum analyzer is an example of the optical measuring unit 65. The optical measuring unit 65 may measure the reception level for each channel. The measurement information receiving unit 66 is connected to the optical measuring unit 65. The measurement information receiving unit 66 delivers the OSNR values of the respective channels output from the optical measuring unit 65 to the CPU 67.

The CPU 67 is connected to the measurement information receiving unit 66. The CPU 67 outputs to the OSNR information inserting unit 69, the OSNR values of the respective channels delivered from the measurement information receiving unit 66. The CPU 67 stores the OSNR values of the respective channels into the memory 68 and manages the values as a table, for example.

The memory 68 is connected to the CPU 67. The memory 68 may store the table for managing the OSNR values of the respective channels and may be used as a work area of the CPU 67. The OSNR information inserting unit 69 is connected to the CPU 67. The OSNR information inserting unit 69 inserts an OSNR value in an overhead frame of signal light for each channel.

The signal light transmitting units 71, 72 output the respective signal lights of the wavelengths $\lambda 1$ to $\lambda n$ to the wavelength multiplexing device 70. The overheads of the signals of the wavelengths include the OSNR values of the respective wavelengths. The wavelength multiplexing device 70 is connected to the signal light transmitting units 71, 72. The wavelength multiplexing device 70 performs the wavelength multiplexing of the signal lights output from the signal light transmitting units 71, 72 and outputs the signal lights to the transmission path connected to the output port not depicted of the apparatus 25. As a result, the OSNR values of the respective channels are transferred to the opposing station, for example, the optical transmission apparatus 21 acting as the transmission end.

The optical transmission apparatus 25 acting as the reception end has the wavelength demultiplexing device 61 and n signal light receiving units 62, 63 corresponding to the wavelengths of $\lambda 1$ to $\lambda n$. The wavelength demultiplexing device 61 demultiplexes the input wavelength multiplexed light into lights of the wavelengths $\lambda 1$ to $\lambda n$ and outputs the lights to the corresponding signal light receiving units 62, 63. The signal light receiving units 62, 63 are coupled to the wavelength demultiplexing device 61. The signal light receiving units 62, 63 receive and transfer the signal lights of the wavelengths $\lambda 1$ to $\lambda n$ from the wavelength demultiplexing device 61 to a processing unit downstream (not depicted).

Figures 11, 12:
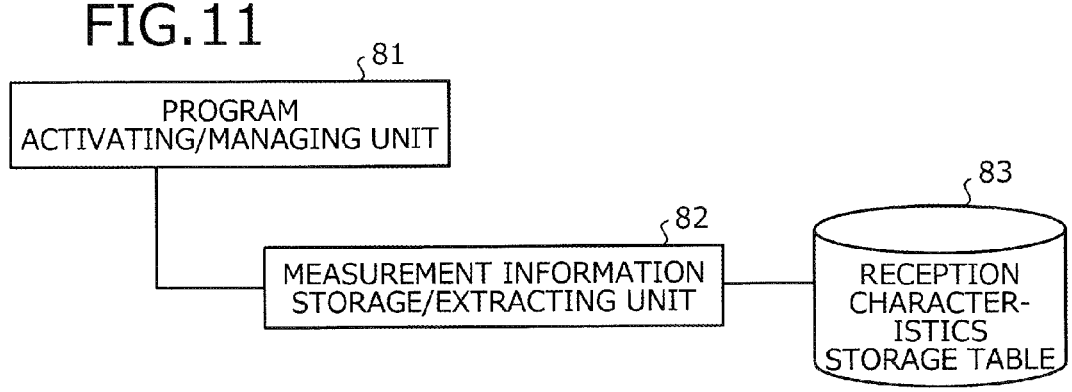
FIG. 11 is a diagram of an example of a functional configuration of a monitoring unit in the optical transmission apparatus depicted in FIG. 10.
FIG. 12 is a diagram of an example of a reception characteristics storage table.

FIG. 11 is a diagram of an example of a functional configuration of a monitoring unit in the optical transmission apparatus depicted in FIG. 10. As depicted in FIG. 11, the optical transmission apparatus 25 acting as the reception end implements a program activating/managing unit 81 and a measurement information storage/extracting unit 82. A reception characteristics storage table 83 is implemented in the memory 68. These functional units 81, 82, and the reception characteristics storage table 83 are implemented by executing a program that manages the OSNR values, on the CPU 67 of the monitoring unit 64. The program managing the OSNR value will not be described.

The program activating/managing unit 81 activates the program that manages the OSNR values and calls the measurement information storage/extracting unit 82 accompanying the execution of the program. The measurement information storage/extracting unit 82 stores the OSNR values of the respective channels measured by the optical measuring unit 65. The measurement information storage/extracting unit 82 acquires the OSNR values of the respective channels, from the reception characteristics storage table 83.

FIG. 12 is a diagram of an example of the reception characteristics storage table. As depicted in FIG. 12, the reception characteristics storage table 83 may have a record for each sub-band number or each channel number. In each record, the OSNR measurement values of the channels may be stored. Although numerical values are depicted in FIG. 12 as an example, the number of sub-bands and the number of channels per sub-band are not limited to the numerical values of the depicted example. The OSNR values are an example.

Figure 13:
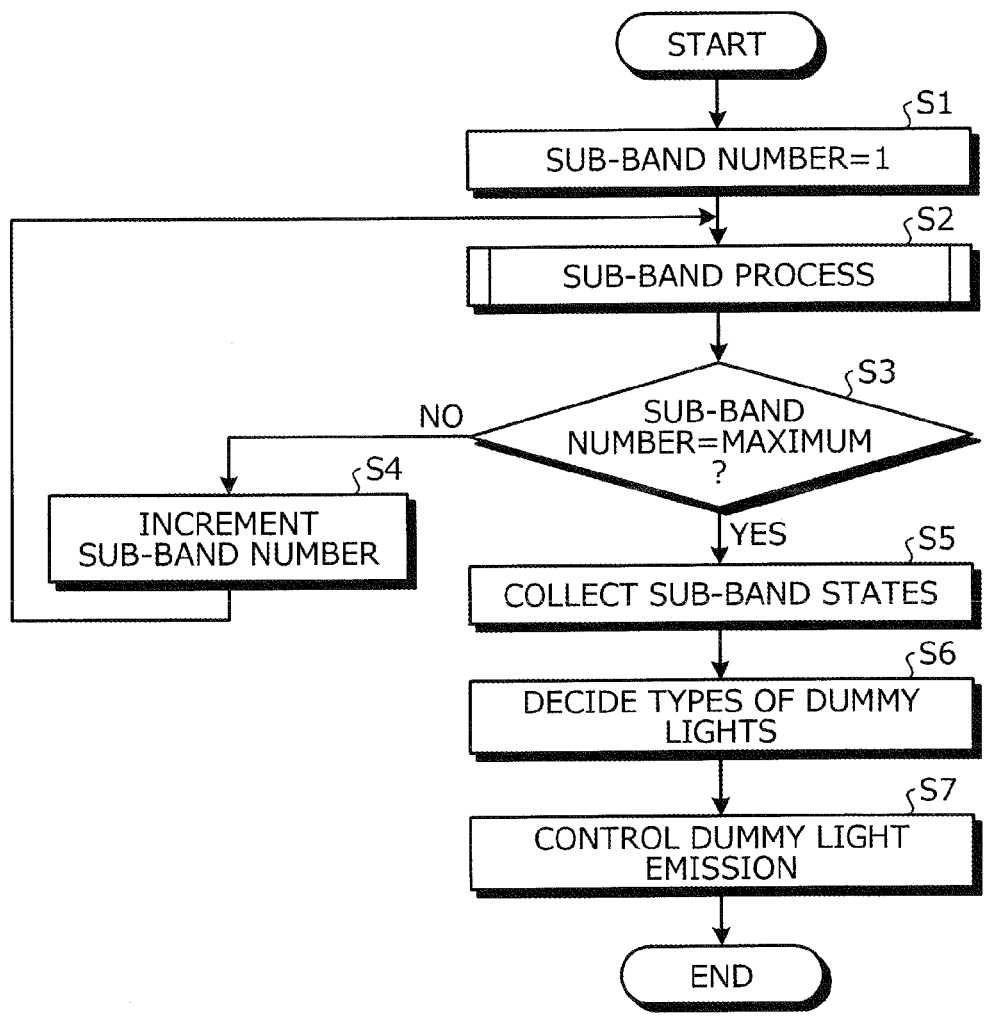
FIG. 13 is a diagram of an example of a dummy light inserting method according to the embodiment.

FIG. 13 is a diagram of an example of the dummy light inserting method according to the embodiment. As depicted in FIG. 13, at the time of initial introduction of the optical transmission apparatus 21 acting as the transmission end, when the optical transmission apparatus 21 starts a process of implementing the dummy light inserting method, first, for example, the dummy light decision processing unit 56 sets the sub-band number to one (step S1). For example, the dummy light emission control unit 52, the opposing station information collection/average processing unit 53, the transmission level variable processing unit 54, and the sub-band state determining unit 55 execute a sub-band process (described later) for the sub-band having the sub-band number of one (step S2). For example, the dummy light decision processing unit 56 then determines whether the sub-band number is the maximum sub-band number (step S3).

If the sub-band number is not the maximum (step S3: NO), for example, the dummy light decision processing unit 56 increments the sub-band number (step S4). The sub-band process is executed for the sub-band of the new sub-band number (step S2). Steps S2 to S4 are repeated until the sub-band number is maximized and the sub-band process is executed for all the sub-bands. When the sub-band process has been executed for all the sub-bands, the state of each sub-band is determined.

If the sub-band number is the maximum sub-band number (step S3: YES), the states of all the sub-bands have been determined and therefore, for example, the dummy light decision processing unit 56 collects the states of the sub-bands (step S5) and decides the types of the dummy lights according to the states of the sub-bands (step S6). For example, the dummy light emission control unit 52 provides the emission control of the dummy lights to the wavelength selection switch 40 such that the dummy light determined for each sub-band at step S6 is connected (step S7) and a sequence of the process is terminated.

Figure 14:
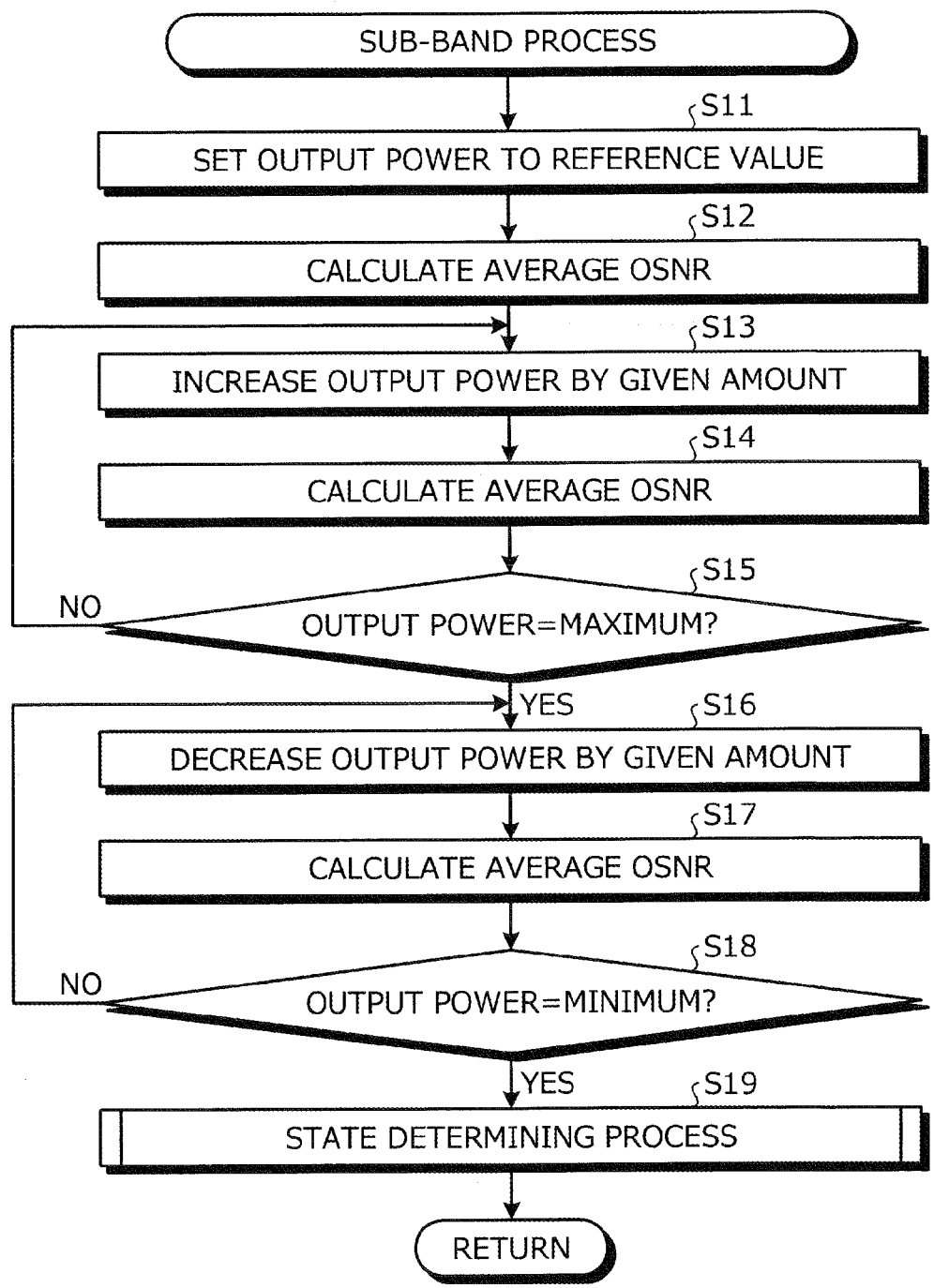
FIG. 14 is a diagram of an example of a sub-band process according to the embodiment.

FIG. 14 is a diagram of an example of a sub-band process according to the embodiment. As depicted in FIG. 14, when the sub-band process is started, for example, the dummy light emission control unit 52 selects the channel dummy lights for all the channels. For example, the transmission level variable processing unit 54 sets the output power of all the channel dummy lights to a reference value (step S11). For example, the opposing station information collection/average processing unit 53 collects the OSNR values of all the channels from the opposing station and calculates the average value of the OSNR values for each sub-band (step S12).

For example, the transmission level variable processing unit 54 increases the output power of all the channel dummy lights from the reference value by a given amount (step S13). For example, the opposing station information collection/average processing unit 53 collects the OSNR values of all the channels from the opposing station and calculates the average value of the OSNR values for each sub-band (step S14). For example, the sub-band state determining unit 55 determines whether the output power of all the channel dummy lights is the maximum power (step S15). A range of the output power is set in advance.

If the output power is not the maximum power (step S15: NO), for example, the transmission level variable processing unit 54 increases the output power of all the channel dummy lights again by a given amount (step S13). The opposing station information collection/average processing unit 53 collects the OSNR values of all the channels from the opposing station and calculates the average value of the OSNR values for each sub-band (step S14). Steps S13 to S15 are repeated until the output power reaches the maximum.

When the output power of all the channel dummy lights reaches the maximum (step S15: YES), for example, the transmission level variable processing unit 54 decreases the output power of all the channel dummy lights by a given amount (step S16). For example, the opposing station information collection/average processing unit 53 collects the OSNR values of all the channels from the opposing station and calculates the average value of the OSNR values for each sub-band (step S17).

For example, the sub-band state determining unit 55 determines whether the output power of all the channel dummy lights is the minimum of the range of the output power (step S18). If the output power is not the minimum (step S18: NO), for example, the transmission level variable processing unit 54 decreases the output power of all the channel dummy lights again by a given amount (step S16). The opposing station information collection/average processing unit 53 collects the OSNR values of all the channels from the opposing station and calculates the average value of the OSNR values for each sub-band (step S17). Steps S16 to S18 are repeated until the output power reaches the minimum.

When the output power of all the channel dummy lights reaches the minimum (step S18: YES), for example, the sub-band state determining unit 55 executes a state determining process (described later) (step S19) and returns to step S3 of the flowchart depicted in FIG. 13. Steps S16 to S18 may be executed before steps S13 to 15.

Figure 15:
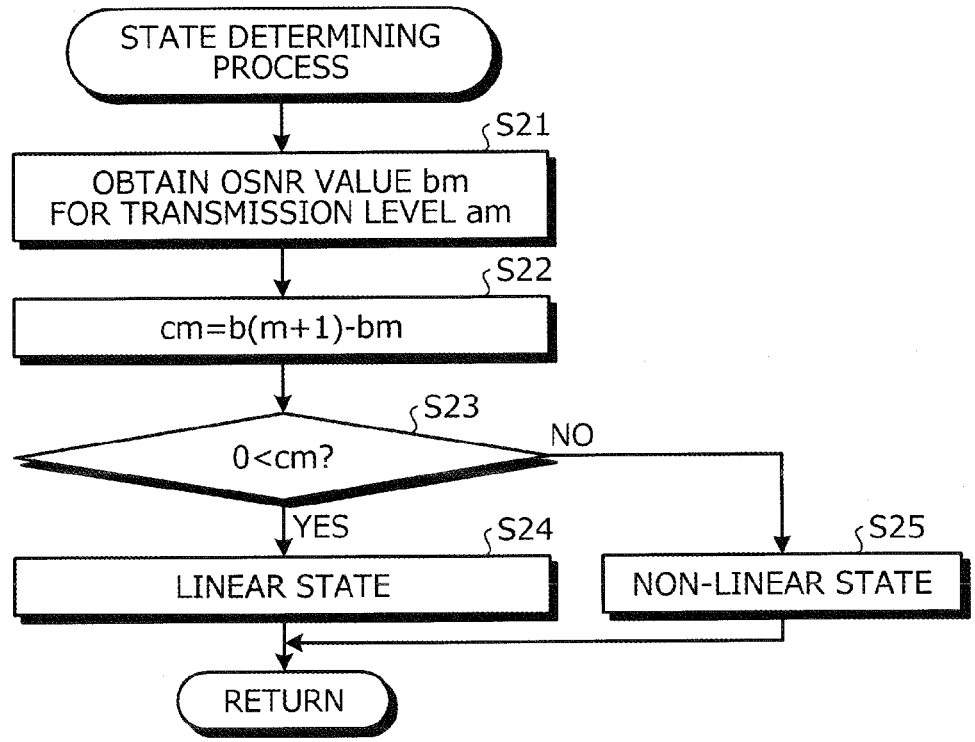
FIG. 15 is a diagram of a first example of a state determining process according to the embodiment.
Figure 16:
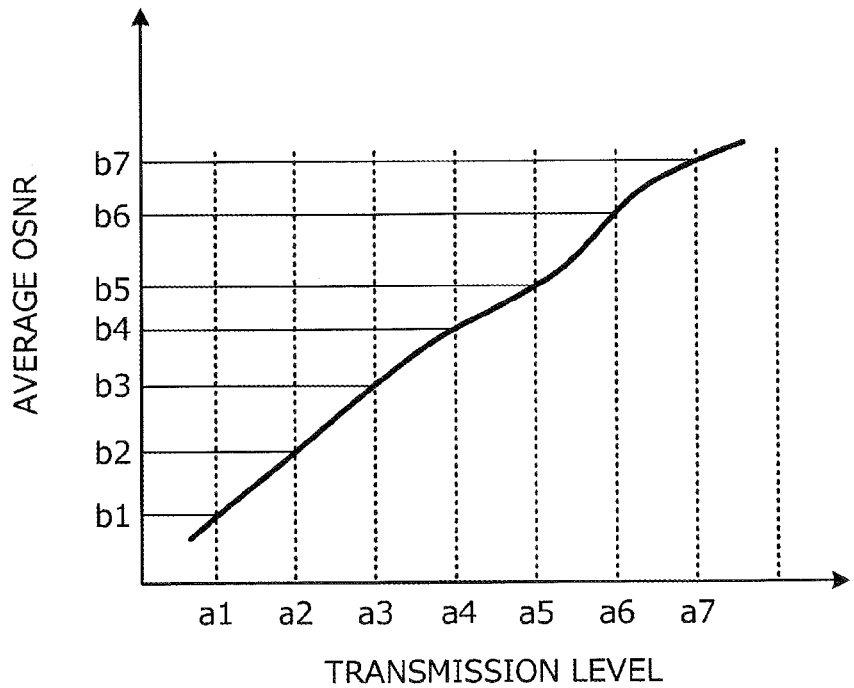
FIG. 16 is a diagram of an example of the relationship between transmission level and average OSNR in the linear state.
Figure 17:
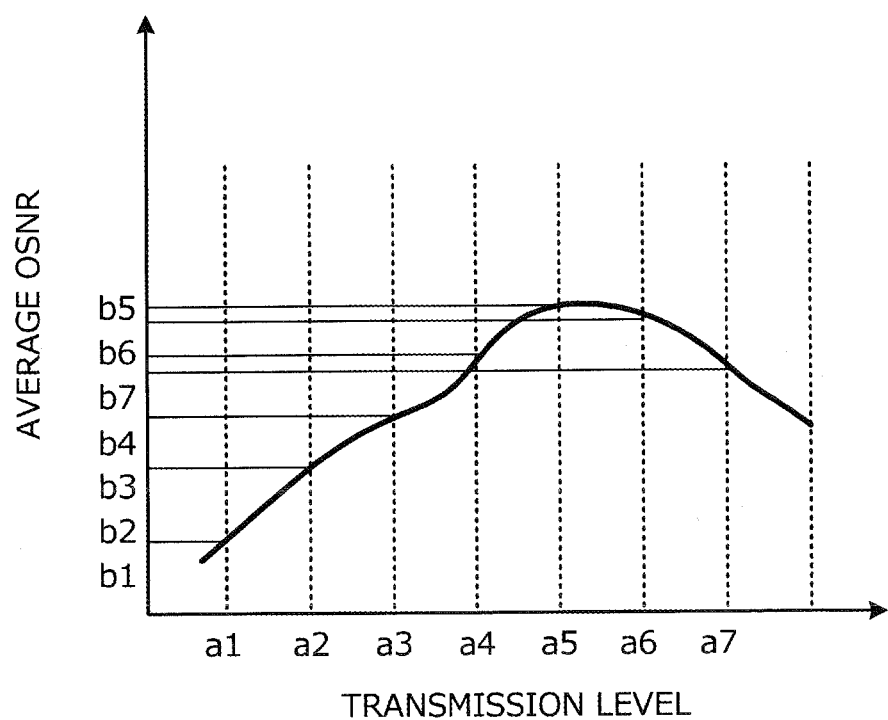
FIG. 17 is a diagram of an example of the relationship between the transmission level and the average OSNR in the nonlinear state.

FIG. 15 is a diagram of a first example of the state determining process according to the embodiment. FIG. 16 is a diagram of an example of the relationship between the transmission level and the average OSNR in the linear state. FIG. 17 is a diagram of an example of the relationship between the transmission level and the average OSNR in the nonlinear state.

In this example, the transmission level value is changed in seven stages from a1 to a7 and the OSNR average value at the transmission level values a1 to a7 is described as b1 to b7, respectively. The transmission level value increases from a1 toward a7. In FIG. 15, m is an integer from one to six.

As depicted in FIG. 15, when the first example of the state determining process is started, for example, the sub-band state determining unit 55 obtains the OSNR average values b1 to b7 at the transmission level values a1 to a7 (step S21). For example, the sub-band state determining unit 55 calculates a difference cm of the OSNR values (step S22). For example, c1 is a value obtained by subtracting b1 from b2, and c2 is a value obtained by subtracting b2 from b3. A value c6 is obtained by subtracting b6 from b7.

For example, the sub-band state determining unit 55 determines whether all the values of c are larger than zero, i.e., whether all the values of c have a plus sign (step S23). If all the values of c have a plus sign (step S23: YES), the relationship between the transmission level and the average OSNR is as depicted in FIG. 16, for example. Therefore, for example, the sub-band state determining unit 55 determines that the state of the sub-band is the linear state (step S24) and returns to step S3 of the flowchart depicted in FIG. 13.

On the other hand, if some values of c have a minus sign (step S23: NO), the relationship between the transmission level and the average OSNR is as depicted in FIG. 17, for example. Therefore, for example, the sub-band state determining unit 55 determines that the state of the sub-band is the nonlinear state (step S25) and returns to step S3 of the flowchart depicted in FIG. 13.

As described above, since the state of the sub-band is determined based on a change in the transmission characteristics in the opposing station, corresponding to an output change in the channel dummy light, the optical transmission apparatus 21 acting as the transmission end can easily determine the state of the sub-band. For example, by knowing whether the OSNR value in the opposing station has improved or deteriorated by an output increase in the channel dummy light, the optical transmission apparatus 21 acting as the transmission end can easily determine whether the state of the sub-band is the linear state or the nonlinear state.

The reference of description returns to the flowchart depicted in FIG. 13. When the type of the dummy light is decided at step S6, for example, the dummy light decision processing unit 56 decides the channel dummy light as the type of the dummy lights to a sub-band in the nonlinear state and sub-bands on the both sides thereof. For example, the dummy light decision processing unit 56 decides the sub-band dummy light as the type of the dummy lights to sub-bands excluding the sub-bands in the nonlinear state and the sub-bands on the both sides thereof.

Figure 18:
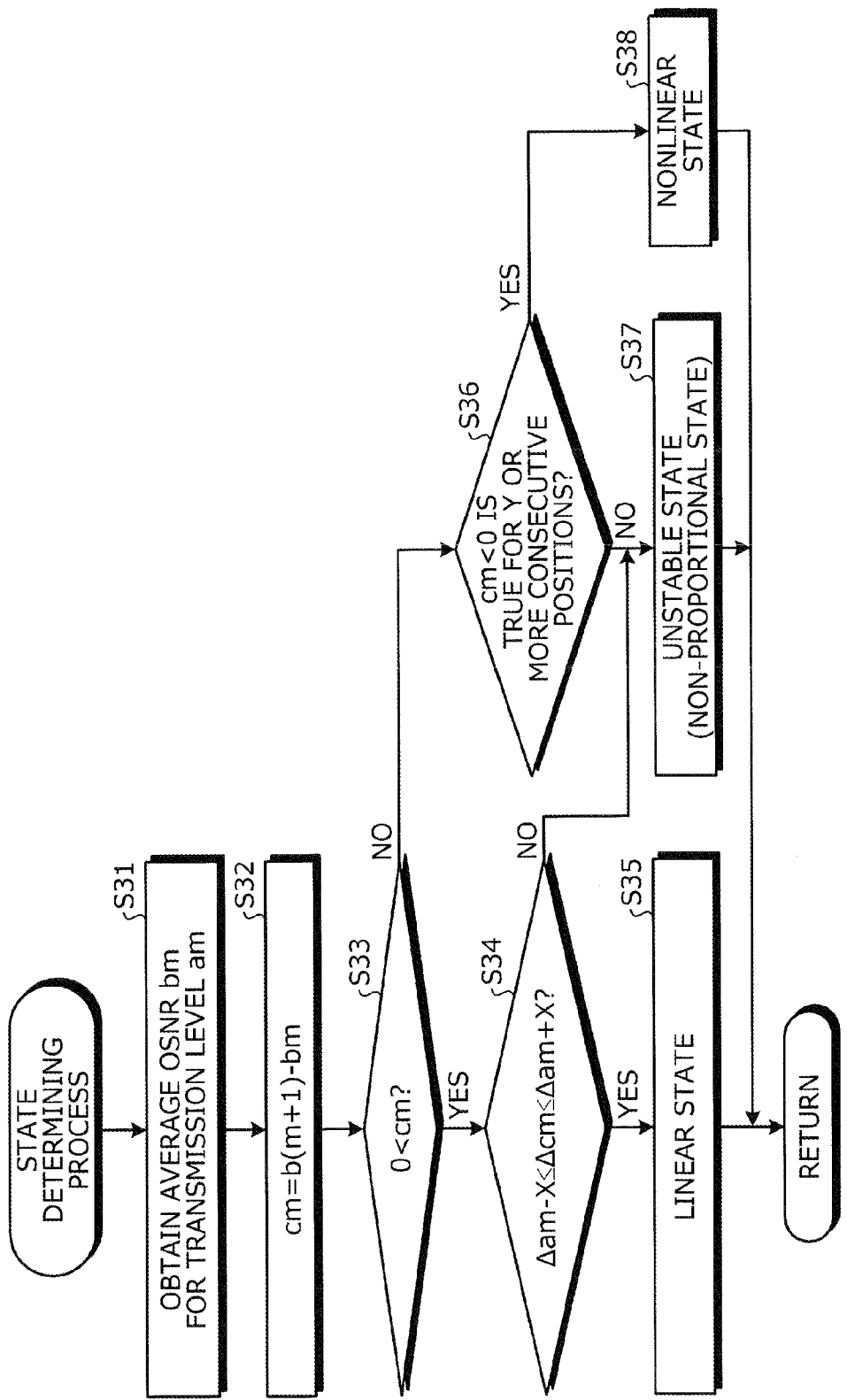
FIG. 18 is a diagram of a second example of the state determining process according to the embodiment.
Figure 19:
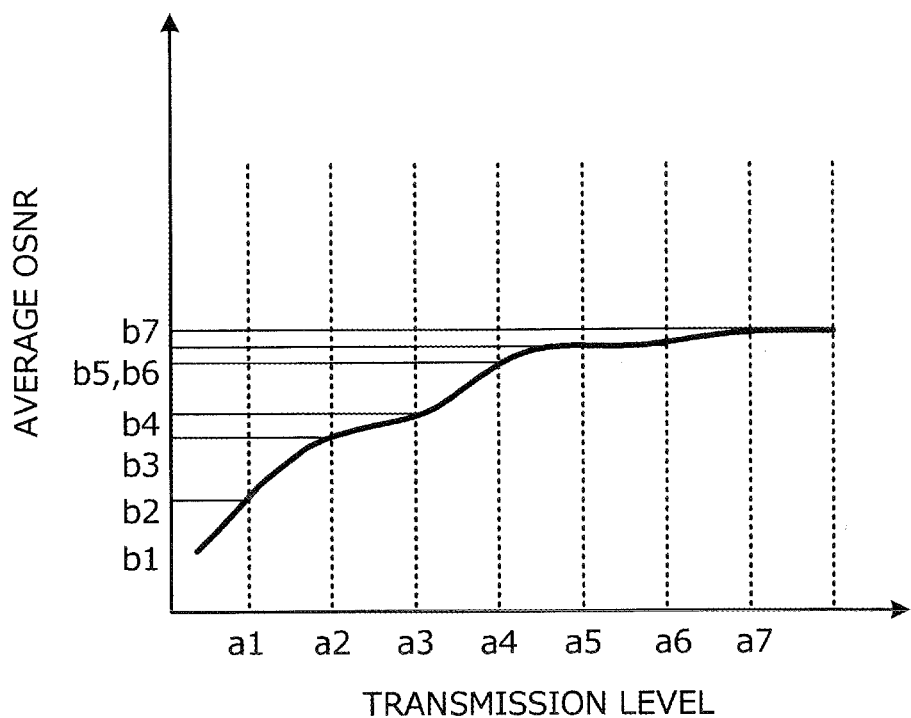
FIG. 19 is a diagram of an example of the relationship between the transmission level and the average OSNR in a state that is neither linear nor nonlinear.

FIG. 18 is a diagram of a second example of the state determining process according to the embodiment. FIG. 19 is a diagram of an example of the relationship between the transmission level and the average OSNR in a state that is neither linear nor nonlinear.

In this example, the transmission level value is changed in seven stages from a1 to a7 and the OSNR average value at the transmission level values a1 to a7 is described as b1 to b7, respectively. The transmission level value increases from a1 toward a7. In FIG. 18, m is an integer from one to six. X is a value that can be changed in the optical transmission apparatus 21 and is determined according to the system. Y is a value dependent on an increase/decrease amount of a transmission level. It is assumed that the increase/decrease amount of the transmission level can be changed according to the system.

As depicted in FIG. 18, when the second example of the state determining process is started, for example, the sub-band state determining unit 55 obtains the OSNR average values b1 to b7 at the respective transmission level values a1 to a7 (step S31). For example, the sub-band state determining unit 55 calculates a difference cm of the OSNR values (step S32). For example, the sub-band state determining unit 55 obtains a value c1 by subtracting b1 from b2, a value c2 by subtracting b2 from b3, . . . , and a value c6 by subtracting b6 from b7.

For example, the sub-band state determining unit 55 determines whether all the values of c are larger than zero, i.e., whether all the values of c have a plus sign (step S33). If all the values of c have a plus sign (step S33: YES), for example, the sub-band state determining unit 55 determines whether an increase amount Δc of the c-value is within ±X dB relative to an increase amount Δa of the transmission level value (step S34). For example, it is determined if Δc is greater than or equal to a value obtained by subtracting X from Δa and less or equal to a value obtained by adding X to Δa.

If Δc is within Δa±X dB (step S34: YES), the relationship between the transmission level and the average OSNR is as depicted in FIG. 16, for example. Therefore, for example, the sub-band state determining unit 55 determines that the state of the sub-band is the linear state (step S35) and returns to step S3 of the flowchart depicted in FIG. 13.

If Δc is not within Δa±X dB (step S34: NO), the relationship between the transmission level and the average OSNR is as depicted in FIG. 19, for example. Although the characteristics depicted in FIG. 19 are not in the nonlinear state, the relationship of the OSNR average value relative to the transmission level value is not a proportional relationship. Therefore, for example, the sub-band state determining unit 55 determines that the state of the sub-band is an unstable state or a non-proportional state (step S37), and returns to step S3 of the flowchart depicted in FIG. 13.

On the other hand, if some values of c have a minus sign (step S33: NO), for example, the sub-band state determining unit 55 determines whether the c-values having a minus sign are located at Y or more consecutive positions (step S36). If the c-values having a minus sign are not located at Y or more consecutive positions (step S36: NO), this means that the c-values may on one occasion or occasionally have a minus sign and therefore, the relationship between the transmission level and the average OSNR is as depicted in FIG. 19, for example. Therefore, also in this case, for example, the sub-band state determining unit 55 determines that the state of the sub-band is an unstable state or a non-proportional state (step S37), and returns to step S3 of the flowchart depicted in FIG. 13.

In contrast, if the c-values having a minus sign are located at Y or more consecutive positions (step S36: YES), the relationship between the transmission level and the average OSNR is as depicted in FIG. 17, for example. Therefore, for example, the sub-band state determining unit 55 determines that the state of the sub-band is the nonlinear state (step S38) and returns to step S3 of the flowchart depicted in FIG. 13.

As described, by knowing whether the OSNR value in the opposing station has improved, deteriorated, or neither improved nor deteriorated by an output increase in the channel dummy light, the optical transmission apparatus 21 acting as the transmission end can easily determine whether the state of the sub-band is a linear state, a nonlinear state, or an unstable or a non-proportional state.

The reference of the description returns to the flowchart depicted in FIG. 13. When the type of the dummy light is decided at step S6, for example, the dummy light decision processing unit 56 decides the channel dummy light as the type of the dummy light to a sub-band in the nonlinear state and sub-bands on the both sides thereof. For example, the dummy light decision processing unit 56 decides the channel dummy light as the type of the dummy light to a sub-band in the unstable state or the non-proportional state. For example, the dummy light decision processing unit 56 decides the sub-band dummy light as the type of the dummy lights to sub-bands excluding the sub-bands in the nonlinear state, the sub-bands on the both sides of the nonlinear state, and the sub-bands in the unstable state or the non-proportional state.

Figure 21:
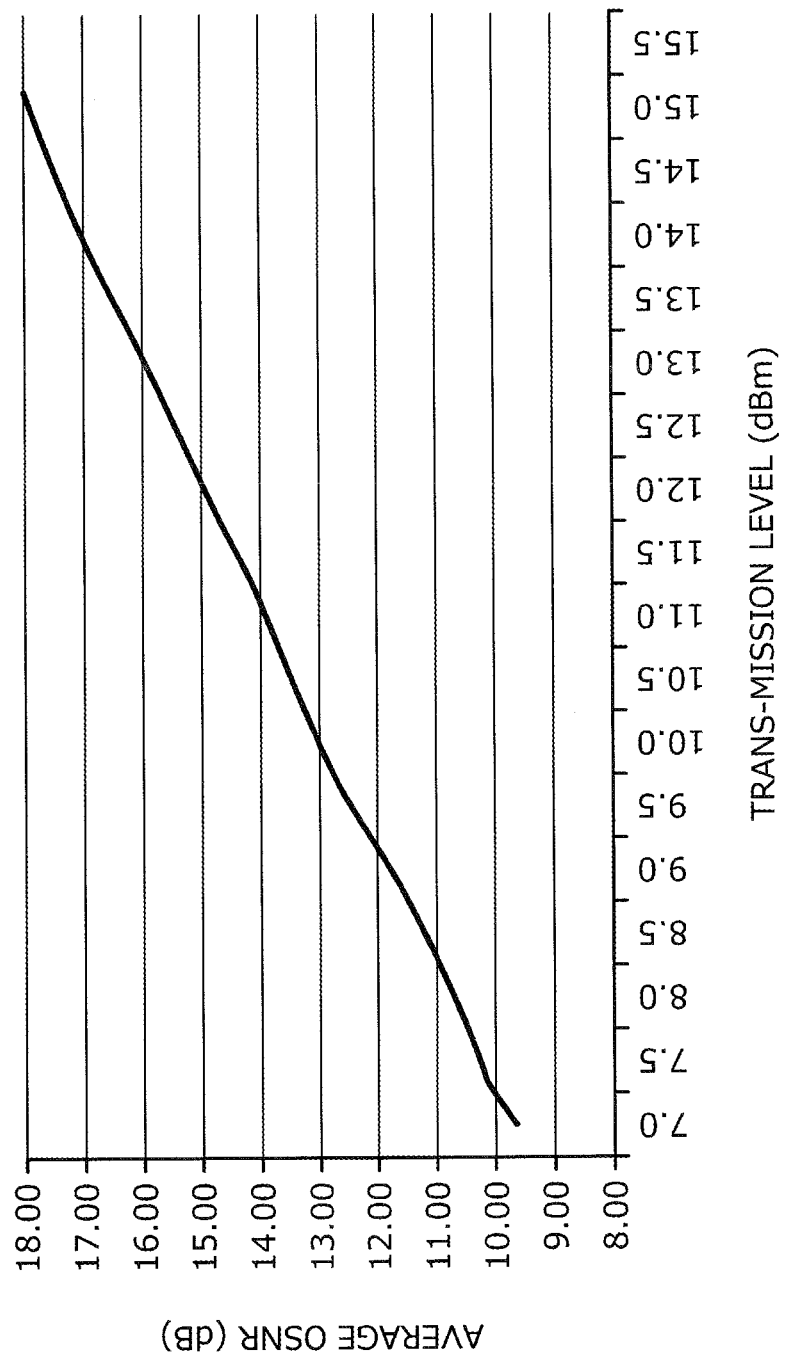
FIG. 21 is a diagram of the relationship between the transmission level and the average OSNR graphed based on the record contents depicted in FIG. 20.

FIGS. 20 to 24 depict specific examples in the case of applying the first example of the state determining process. FIG. 20 is a diagram of an example of a record of the sub-band number 1 in the sub-band state management table and FIG. 21 is a diagram of the relationship between the transmission level and the average OSNR graphed based on the record contents depicted in FIG. 20. In the example depicted in FIGS. 20 and 21, the state of the sub-band of the sub-band number 1 is the linear state.

Figure 23:
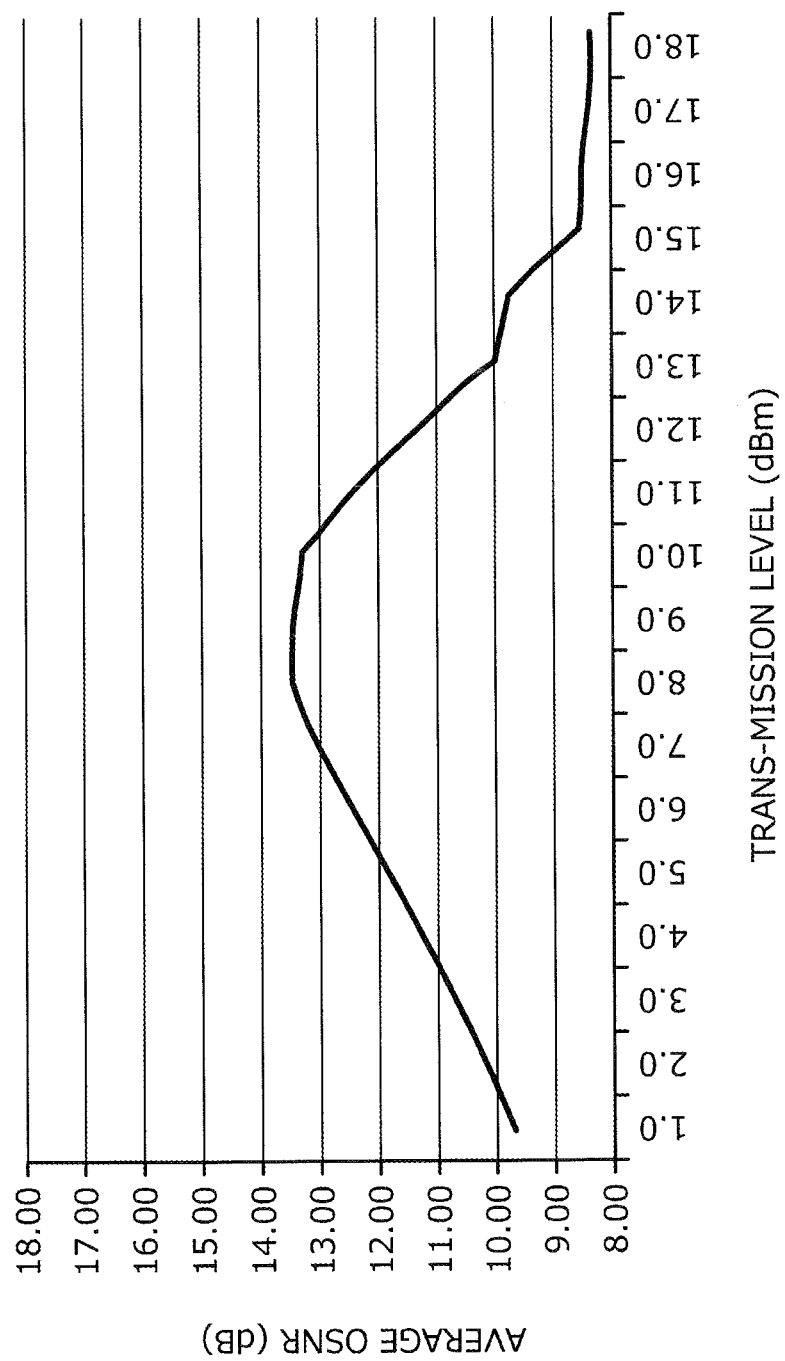
FIG. 23 is a diagram of the relationship between the transmission level and the average OSNR graphed based on the record contents depicted in FIG. 22.

FIG. 22 is a diagram of an example of a record of the sub-band number 6 in the sub-band state management table and FIG. 23 is a diagram of the relationship between the transmission level and the average OSNR graphed based on the record contents depicted in FIG. 22. In the example depicted in FIGS. 22 and 23, the state of the sub-band of the sub-band number 6 is the nonlinear state.

Figure 24:
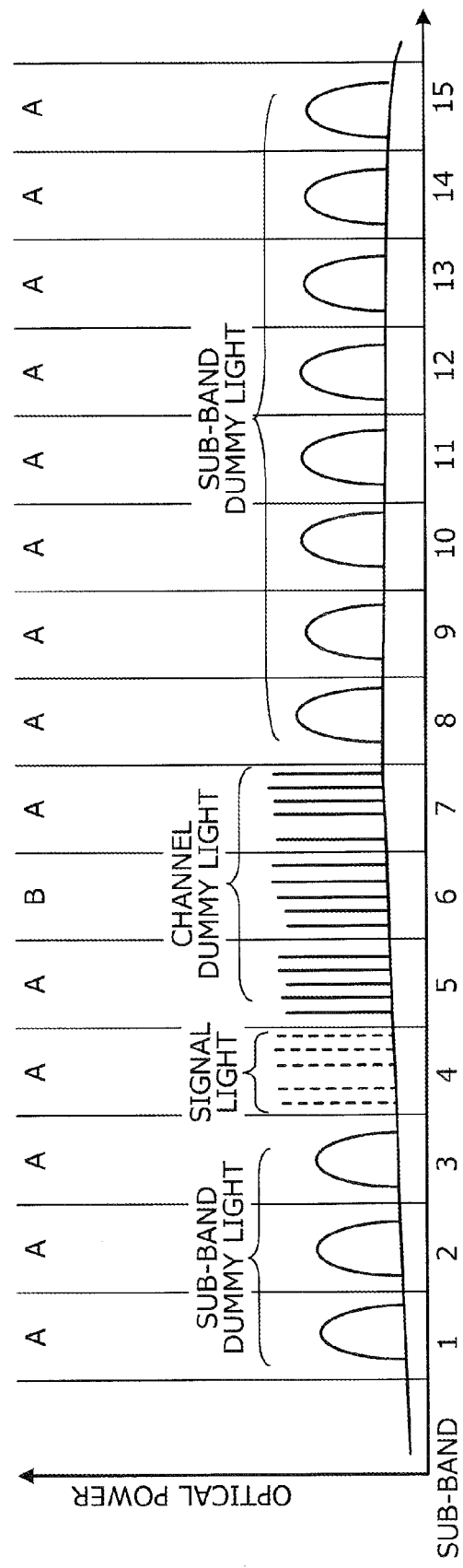
FIG. 24 is a diagram of an example of an emission spectrum reflecting the record contents depicted in FIGS. 20 and 22.

FIG. 24 is a diagram of an example of an emission spectrum reflecting the record contents depicted in FIGS. 20 and 22. However, it is assumed that signal lights are inserted in the sub-band of the sub-band number 4 and that no sub-band in the nonlinear state exists except the sub-band of the sub-band number 6.

In this case, as depicted in FIG. 24, the channel dummy lights are inserted in the sub-bands of the sub-band numbers 5 to 7. The signal lights are inserted in the sub-band of the sub-band number 4 and the sub-band dummy lights are inserted in the remaining sub-bands having the sub-band numbers 1 to 3 and 8 to 15.

The reason for inserting the channel dummy lights into the sub-band in the nonlinear state and the sub-bands on the both sides thereof is as follows. For example, in the example depicted in FIG. 24, it is assumed that the sub-band dummy lights are inserted into the sub-band of the sub-band number 6 in the nonlinear state and the sub-bands of the sub-band numbers 5 and 7 on the both sides thereof. In this state, the sub-band dummy light of the sub-band of the sub-band number 6 is assumed to be removed to newly add signal light.

In this case, the transmission level corresponding to the removal of the sub-band dummy light of the sub-band number 6 must be adjusted by the transmission levels of the existing sub-band dummy light, for example, the sub-band dummy light of the sub-band number 7. If the power of the sub-band dummy light is changed in the sub-band of the sub-band number 7, a change accordingly occurs in the power of the signal light added to the sub-band of the sub-band number 6.

The sub-band of the sub-band number 6 is in the nonlinear state and therefore, is an area vulnerable to power variation. As a result, a phenomenon called self-phase modulation or optical four-wave mixing may be generated depending on the power amount of the signal light, causing considerable variation in the characteristics of the signal light, whereby level adjustment becomes difficult.

In contrast, if the channel dummy lights are inserted in the sub-band of the sub-band number 6 in the nonlinear state, the sub-band of the sub-band number 6 is in a gain state equivalent to the signal light from the initial operational phase. As a result, the channel dummy light can be easily removed from the sub-band of the sub-band number 6 to add the signal light instead. In other words, the highly difficult level adjustment operation becomes unnecessary. Therefore, the channel dummy lights are preferably inserted into a sub-band in the nonlinear state.

If the dummy lights are the channel dummy lights in the sub-bands of the sub-band numbers 5 and 7 on both sides of the sub-band of the sub-band number 6 in the nonlinear state, for example, the level of the channel dummy light of the sub-band of the sub-band number 7 can be adjusted more finely. As a result, the level adjustment can be performed while the effect on the signal light added to the sub-band of the sub-band number 6 is suppressed. Therefore, the channel dummy lights are preferably inserted into the sub-bands on the both sides of the sub-band in the nonlinear state.

Figure 26:
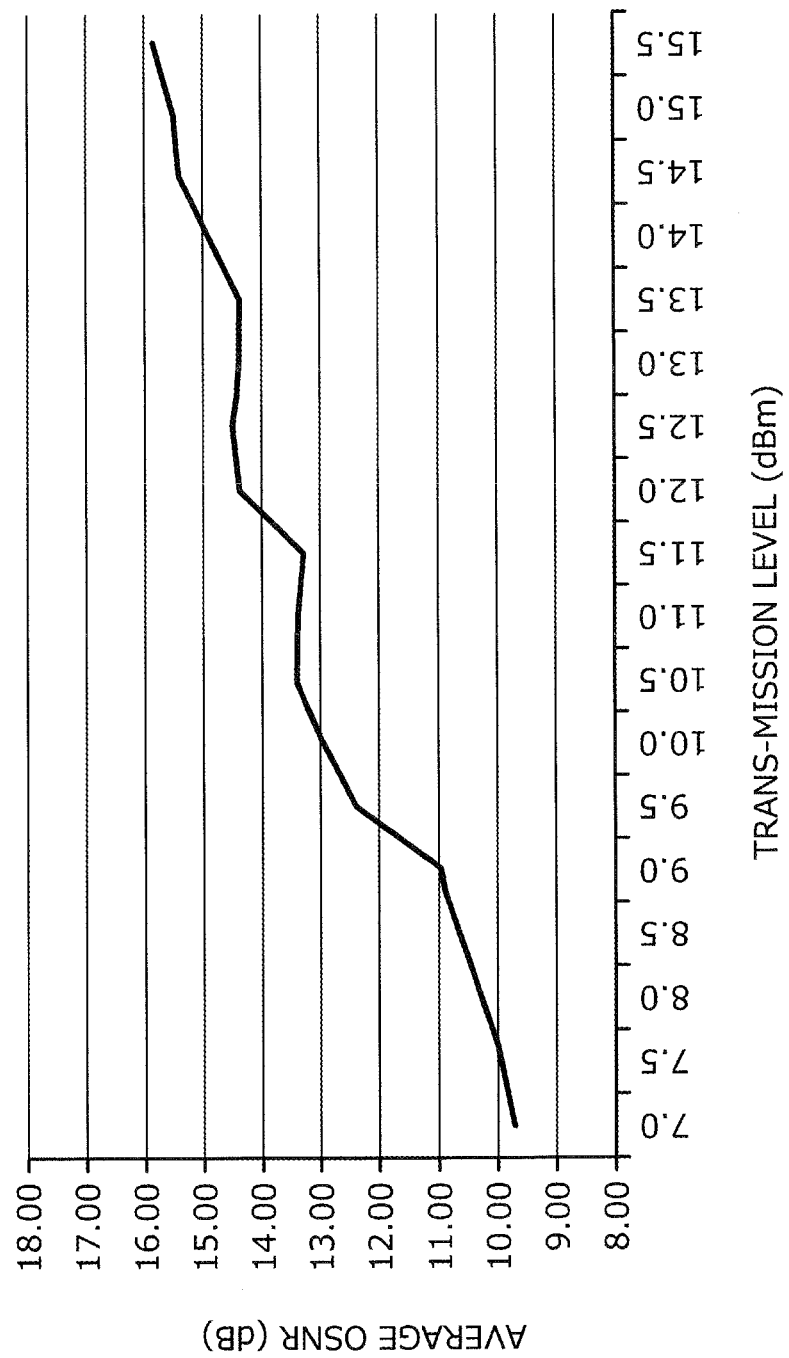
FIG. 26 is a diagram of the relationship between the transmission level and the average OSNR graphed based on the record contents depicted in FIG. 25.

FIGS. 25 to 27 depict specific examples in the case of applying the second example of the state determining process. FIG. 25 is a diagram of an example of a record of the sub-band number 3 in the sub-band state management table. FIG. 26 is a diagram of the relationship between the transmission level and the average OSNR graphed based on the record contents depicted in FIG. 25. In the example depicted in FIGS. 25 and 26, the state of the sub-band of the sub-band number 3 is the unstable state or the non-proportional state.

FIG. 27 is a diagram of an example of an emission spectrum reflecting the record contents depicted in FIGS. 20, 22, and 25. However, it is assumed that signal lights are inserted in the sub-band of the sub-band number 4 and that no sub-band in the nonlinear state exists except the sub-bands of the sub-band numbers 3 and 6.

In this case, as depicted in FIG. 27, the channel dummy lights are inserted in the sub-band of the sub-band number 3. The channel dummy lights are inserted in the sub-bands of the sub-band numbers 5 to 7. The signal lights are inserted in the sub-band of the sub-band number 4 and the sub-band dummy lights are inserted in the remaining sub-bands having the sub-band numbers 1, 2, and 8 to 15.

The reason for inserting the channel dummy lights into the sub-band in the unstable state or the non-proportional state is as follows. The state of a sub-band is put into the unstable state or the non-proportional state because of factors such as loss characteristics of optical fibers of transmission paths, wavelength dependency of gain and a polarization state, etc. It is known that this phenomenon is confined within the effect in the sub-band where this phenomenon occurs, and has no direct effect on adjacent sub-bands.

For example, in the example depicted in FIG. 27, it is assumed that the sub-band dummy lights are inserted into the sub-band of the sub-band number 3 in the unstable state or the non-proportional state and the adjacent sub-band of the sub-band number 2. In this state, the sub-band dummy light of the sub-band of the sub-band number 3 is assumed to be removed to newly add signal light.

In this case, since the sub-band of the sub-band number 3 is not in the nonlinear state, rapid characteristic deterioration does not occur; however, no relationship is found between the transmission level and reception characteristics. Therefore, to improve the reception characteristics, it is conceivable that a level is increased in the newly added signal light or that a level is adjusted in the sub-band dummy light of the sub-band number 2 or in the signal lights of the sub-band of the sub-band number 4.

However, since the unstable state or the non-proportional state is a phenomenon confined in the sub-band, even if a level of another sub-band is adjusted, the characteristics of the newly added signal light are unlikely to be achieved as expected. On the other hand, if the level of the newly added signal light is continuously increased, the self-phase modulation occurs due to the power intensity of the signal light and the reception characteristics may deteriorate.

In this case, the insertion of the channel dummy lights in the sub-band of the sub-band number 3 increases options of the technique for improving the characteristics of the newly added signal light. In particular, this enables adjustment of a level of only the newly added signal light, adjustment of levels of the signal lights or the dummy light of the adjacent sub-bands, and adjustment of levels of the channel dummy lights in the sub-band of the sub-band number 3.

By adjusting the levels of the channel dummy lights in the sub-band of the sub-band number 3, the level of the newly added signal light is prevented from being increased too high. The characteristics can be improved by performing adjustment such that the transmission level of the newly added signal light is gradually increased while the levels of the channel dummy lights are gradually increased and decreased. Therefore, the channel dummy lights are preferably inserted into a sub-band in the unstable state or the non-proportional state.

According to the optical transmission apparatus 21 depicted in FIG. 7 or the dummy light inserting method depicted in FIGS. 13 to 15 or FIG. 18, the state of a sub-band is determined based on the OSNR value at the reception end, and the sub-band dummy light or the channel dummy light is inserted according to the state of the sub-band. As a result, since the channel dummy lights are inserted into a sub-band in the nonlinear state, sub-bands on both sides of the sub-band in the nonlinear state, and a sub-band in the unstable state or the non-proportional state, the transmission level of the dummy light can be finely adjusted. Therefore, if the wavelengths of signal lights are increased or decreased after start of the operation of the optical transmission apparatus 21, the transmission level of the dummy light can be finely adjusted, thereby suppressing the effects on existing signal lights and a newly added signal light. Since the sub-band dummy light is inserted into a sub-band in the linear state, the transmission level of the dummy light can be quickly adjusted, for example, as compared to the case of inserting the channel dummy lights into all the channels, at the time of initial introduction of the optical transmission apparatus 21.

According to the optical transmission apparatus 21 depicted in FIG. 7, since the CPU 43 controls the variable optical attenuators 39 and the wavelength selection switch 40, a physical connection change between the signal light and the dummy light becomes unnecessary. Therefore, the operation of increasing or decreasing the signal lights can be performed more safely.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus comprising:
   a wavelength multiplexing unit that performs wavelength multiplexing at least one among dummy light for each channel of WDM and dummy light for each sub-band including a plurality of the channels with a signal light; and
   a selecting unit that measures for each sub-band and corresponding to intensity of the channel-specific dummy light, transmission characteristics at a reception end, and according to results from the selecting unit that measures for each sub-band, selects for each of the sub-bands, any one among the channel-specific dummy light and the sub-band-specific dummy light, wherein
   the wavelength multiplexing unit wavelength multiplexes at least one among the channel-specific dummy light and the sub-band-specific dummy light selected for each of the sub-bands by the selecting unit with the signal light.

2. The optical transmission apparatus according to claim 1, wherein
   the selecting unit determines for each of the sub-bands and based on a measurement result of the transmission characteristics at the reception end, whether a linear state exists, selects the sub-band-specific dummy light for a sub-band for which the linear state is determined, and selects the channel-specific dummy light for a sub-band for which a nonlinear state is determined and for sub-bands on each side of the sub-band having the nonlinear state.

3. The optical transmission apparatus according to claim 2, wherein
   the selecting unit selects the channel-specific dummy light for a sub-band for which neither the linear state nor the nonlinear state is determined.

4. The optical transmission apparatus according to claim 2, wherein the selecting unit determines a state of the sub-band based on a change in the transmission characteristics at the reception end, corresponding to an output change of the channel-specific dummy light.

5. The optical transmission apparatus according to claim 2, wherein the selecting unit determines that the linear state exists when the transmission characteristics at the reception end improve with an output increase of the channel-specific dummy light and determines that the nonlinear state exists when the transmission characteristics at the reception end deteriorate with an output increase in the channel-specific dummy light.

6. The optical transmission apparatus according to claim 3, wherein the selecting unit determines that a state is neither the linear state nor the nonlinear state when relative to an output increase of the channel-specific dummy light, an improvement width of the transmission characteristics at the reception end is not within a given range.

7. The optical transmission apparatus according claim 1, comprising
   a first optical output unit that outputs the channel-specific dummy light for each of the channels;
   a second optical output unit that outputs the sub-band-specific dummy light for each of the sub-bands; and
   variable optical attenuators that respectively adjust the intensity of the channel-specific dummy light input from the first optical output unit to the wavelength multiplexing unit and the intensity of the sub-band-specific dummy light input from the second optical output unit to the wavelength multiplexing unit.

8. A dummy light inserting method of wavelength multiplexing at least one among dummy light for each channel of WDM and dummy light for each sub-band including a plurality of the channels with a signal light, the dummy light inserting method comprising:
   a step for measuring for each sub-band and corresponding to intensity of the channel-specific dummy light, transmission characteristics at a reception end;
   a step for selecting according to measurement results from the step for measuring for each of the sub-bands, any one among the channel-specific dummy light and the sub-band-specific dummy light; and
   a step for wavelength multiplexing at least one among the channel-specific dummy light and the sub-band-specific dummy light selected for each of the sub-bands selected in the step for selecting with the signal light, wherein
   the dummy light inserting method is executed by an optical transmission apparatus.

* * * * *